(12) United States Patent
Kawabe et al.

(10) Patent No.: US 7,761,231 B2
(45) Date of Patent: Jul. 20, 2010

(54) OUTSIDE MONITORING DEVICE FOR MOBILE ROBOT

(75) Inventors: Koji Kawabe, Saitama (JP); Satoki Matsumoto, Saitama (JP); Norihisa Kobayashi, Saitama (JP); Takeshi Koshiishi, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 904 days.

(21) Appl. No.: 11/092,543

(22) Filed: Mar. 30, 2005

(65) Prior Publication Data

US 2005/0222713 A1 Oct. 6, 2005

(30) Foreign Application Priority Data

Mar. 31, 2004 (JP) ............................. 2004-106794

(51) Int. Cl.
- *G01C 21/00* (2006.01)
- *B25J 5/00* (2006.01)
- *G01C 3/00* (2006.01)
- *G01C 5/00* (2006.01)
- *G01B 11/14* (2006.01)
- *G06F 19/00* (2006.01)
- *G05B 19/04* (2006.01)

(52) U.S. Cl. ................ 701/213; 700/245; 700/257; 700/258; 901/1; 901/47; 356/3; 356/614; 318/568.12

(58) Field of Classification Search ................ 700/257, 700/258, 58, 59, 900; 701/28
See application file for complete search history.

(56) References Cited

U.S. PATENT DOCUMENTS

| | | | | |
|---|---|---|---|---|
| 4,772,875 A | * | 9/1988 | Maddox et al. | 340/522 |
| 5,361,023 A | * | 11/1994 | Kim | 318/568.16 |
| 5,819,008 A | * | 10/1998 | Asama et al. | 700/255 |
| 6,401,846 B1 | | 6/2002 | Takenaka | |
| 6,898,485 B2 | * | 5/2005 | Kuroki et al. | 700/245 |
| 7,024,278 B2 | * | 4/2006 | Chiappetta et al. | 700/245 |
| 7,248,933 B2 | * | 7/2007 | Wildman | 700/90 |
| 2004/0172166 A1 | * | 9/2004 | Lapstun et al. | 700/245 |
| 2004/0223629 A1 | * | 11/2004 | Chang | 382/118 |
| 2005/0002481 A1 | * | 1/2005 | Woo et al. | 375/354 |
| 2007/0247316 A1 | * | 10/2007 | Wildman et al. | 340/572.4 |

FOREIGN PATENT DOCUMENTS

| | | |
|---|---|---|
| JP | 09-171599 A | 6/1997 |
| JP | 20010-62760 | 3/2001 |
| JP | 2002-154084 | 5/2002 |
| JP | 2002-350555 A | 12/2002 |
| JP | 2003-266353 | 9/2003 |

\* cited by examiner

*Primary Examiner*—Khoi Tran
*Assistant Examiner*—Nicholas Kiswanto
(74) *Attorney, Agent, or Firm*—Squire, Sanders & Dempsey, L.L.P.

(57) ABSTRACT

An outside monitoring device of a mobile robot for measuring a direction of a target object using a tag, which is provided on a target object and replies a receipt signal to the mobile robot in compliance with a light signal from the mobile robot, the outside monitoring device including a plurality of light emitters each irradiating the light signal to an assigned detectable region among detectable regions established around the mobile robot are provided on the mobile robot, wherein light emitters are arranged around a reference axis orthogonal to a ground plane of the mobile robot to allow the detection of the tag within detectable regions.

14 Claims, 18 Drawing Sheets

US 7,761,231 B2

OUTSIDE MONITORING DEVICE FOR MOBILE ROBOT

BACKGROUND OF THE INVENTION

1. Field of the Invention

The present invention relates to an outside monitoring device which monitors a state of a surrounding area of a mobile robot. Especially, the present invention relates to a monitoring device for a mobile robot that allows extending a detectable range in the surrounding area of mobile robot.

2. Description of Relevant Art

Conventionally, a mobile robot (hereinafter referred to as "robot") equips with various kinds of an outside monitoring apparatuses for monitoring an external state. In Japanese unexamined patent publication JP2003-266353, for example, various kinds of sensor, e.g. an image pickup unit, a microphone, a touch sensor, and a light sensor, are provided on the robot, and the outputs from these sensors are used for actuating the robot.

In the case of the robot disclosed in Japanese unexamined patent publication JP2002-154084, an image pickup device is provided on a head of the robot whose head is being movable around a vertical axis and a horizontal axis. In this robot, the occurrence of the distortion of the image that is caused due to the change of the direction of eyes (camera) is controlled by constantly synchronizing the turn of the head of the robot and the direction of the eyes of the image pickup device.

In the above described apparatuses disclosed in JP2003-266353 and JP2002-154084, the monitoring is performed using an image pickup device (camera) which serves as an outside monitoring device and which are directed in a fore direction.

That is, the monitoring of a target object, e.g. shape of the target object, that is located in front of the image pickup device is performed using the image pickup device (camera).

Therefore, if the head of the robot is directed to a fore direction, the monitorable region is limited to the region in front of the robot. Thus, the target object which approaches the robot from behind and the target object at the back of the robot are not detected by the robot.

Additionally, if a camera is used for detecting the movement of the target object, a complicated processing, such as the comparison between the previous image and the next image, is required.

Therefore, the outside monitoring device for a robot that can monitor a state of a surrounding area of the robot and measure the direction of a target object by simple processing has been required.

SUMMARY OF THE INVENTION

The present invention relates to an outside monitoring device of a mobile robot for measuring a direction of a target object using a tag, which is provided on a target object and replies a receipt signal to the mobile robot in compliance with a light signal from the mobile robot. The outside monitoring device includes a plurality of light emitters, and each of the light emitter irradiates a light signal to an assigned detectable region among detectable regions established around the mobile robot. Here, light emitters are arranged around a reference axis orthogonal to a ground plane of the mobile robot to allow the detection of the tag within detectable regions.

In this device, a plurality of detectable regions is established around the robot and each light emitter is arranged so that the light emitter is directed to an assigned detectable region. Thus, the detection of the target object with tag can be achieved irrespective of the position in a surrounding area (detectable regions) of the target object.

Additionally, since each light emitter is assigned to a predetermined detectable region and this provides directivity, the direction of the target object with tag can be measured surely. In this case, the determination of the direction of the tag (target object) can be achieved with a simple processing, i.e. the direction of the tag (target object) can be determined by identifying the light emitter which has irradiated a light signal received by the tag of the target object.

Here, it is preferable that the mobile robot has a head part, which is supported by a body part, and light emitters are provided on the head part.

In this case, since light emitters are arranged at high place and the detection of the tag can be performed from a high place, the detection of the target object throughout wide range can be achieved.

This improves the accuracy of the authenticity of the detection of the target object.

In this invention, it is preferable that an outside image pickup device is provided on the head part, and the light emitter is placed above the outside image pickup device. In this case, the measurement of the direction of the tag can be performed on a level with the outside image pickup device and the detection of the target object can be achieved with accuracy. Thereby, the image pickup of the target object can be achieved by tracing the travel of the target object with tag even if the position of the target object with tag changes constantly.

Here, it is preferable that the mobile robot has a head part, which is supported by a body part, and that the light emitter is provided on the body part of the mobile robot. In this case, since light emitters are arranged at low place, the detection of the target object can be achieved accurately, even if the target object is in a low place in the vicinity of the mobile robot.

In the device of the present invention, it is preferable that the head part is adapted to turn around the reference axis along an alignment direction of light emitters. Here, if this device is used in combination with the mechanism which turns the head, the detection of the tag on the target object can be achieved more accurately. If the outside image pickup device, for example, is provided on the head part of the robot, since the outside image pickup device can be directed to the direction of the tag, the detection of the tag can be achieved more accurately and speedy.

The outside monitoring device of the present invention may include a plurality of radio transceivers, which transmit radio wave to an assigned detectable region among detectable regions established around the mobile robot, instead of light emitters.

In this case it is preferable that the tag replies a receipt signal to the mobile robot in compliance with radio wave from the mobile robot, and radio transceivers are arranged around a reference axis orthogonal to a ground plane of the mobile robot to allow the detection of the tag within detectable regions.

In this case, since the directivity can be improved by increasing the frequency of radio wave, the detectable range in the surrounding area of the mobile robot can be extended. Thereby, the detection of the target object within the detectable areas and the measuring of the direction of the target object can be achieved accurately.

In this invention, a plurality of light emitters are disposed on the mobile robot and tags for receiving a light signal from the mobile robot are deployed within a surrounding are of the mobile robot. Thus, the detection of the target object and the measuring of the direction of the target object can be achieved accurately with simple processing.

DETAILED DESCRIPTION OF THE PREFERRED EMBODIMENT

Figure 1:
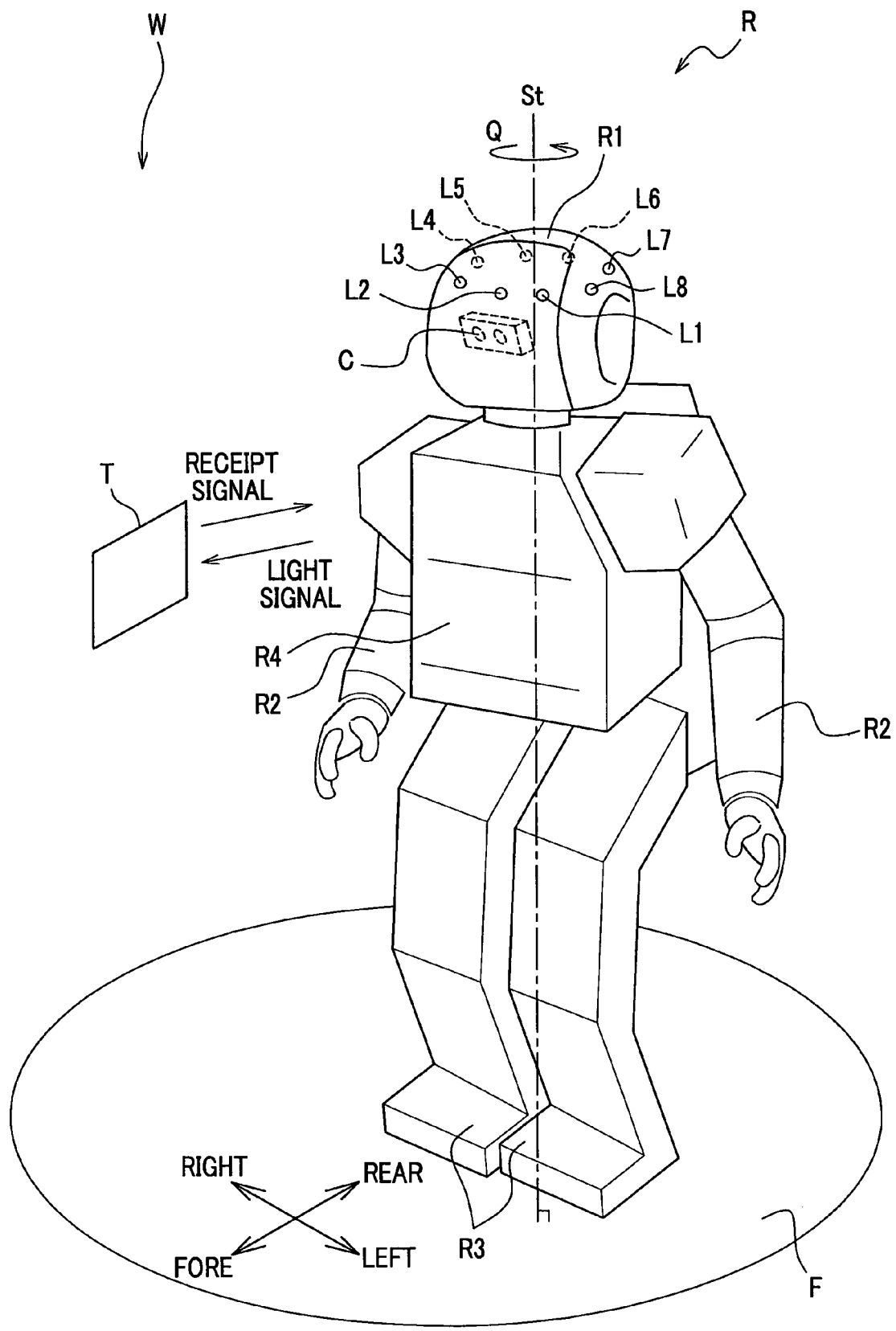
FIG. 1 is a perspective view of an exterior appearance of the robot equipped with the outside monitoring device of first embodiment.

As shown in FIG. 1, an outside monitoring device W (hereinafter referred to as "monitoring device") has plurality of light emitters L1-L8 which are provided on a mobile robot R (hereinafter referred to as "robot"). This monitoring device W detects the direction of a tag T within the surrounding area of the robot R.

The robot R has a head part R1, a pair of arm part R2, a pair of leg part R3, and a body part R4. The body part R4 is provided with the head part R1 on the top thereof, is provided with the arm part R2 on both sides thereof, and is provided with the leg parts R3 at the bottom thereof. Each part (the head part R1, the arm part R2, and the leg part R3) of the robot R is actuated by an actuator to achieve a bipedal walking under the control of the autonomous travel controller 50. The detail of the bipedal walking, for example, is disclosed in Japanese unexamined patent application JP2001-62760. The contents of this application are hereby incorporated by reference.

Figure 2:
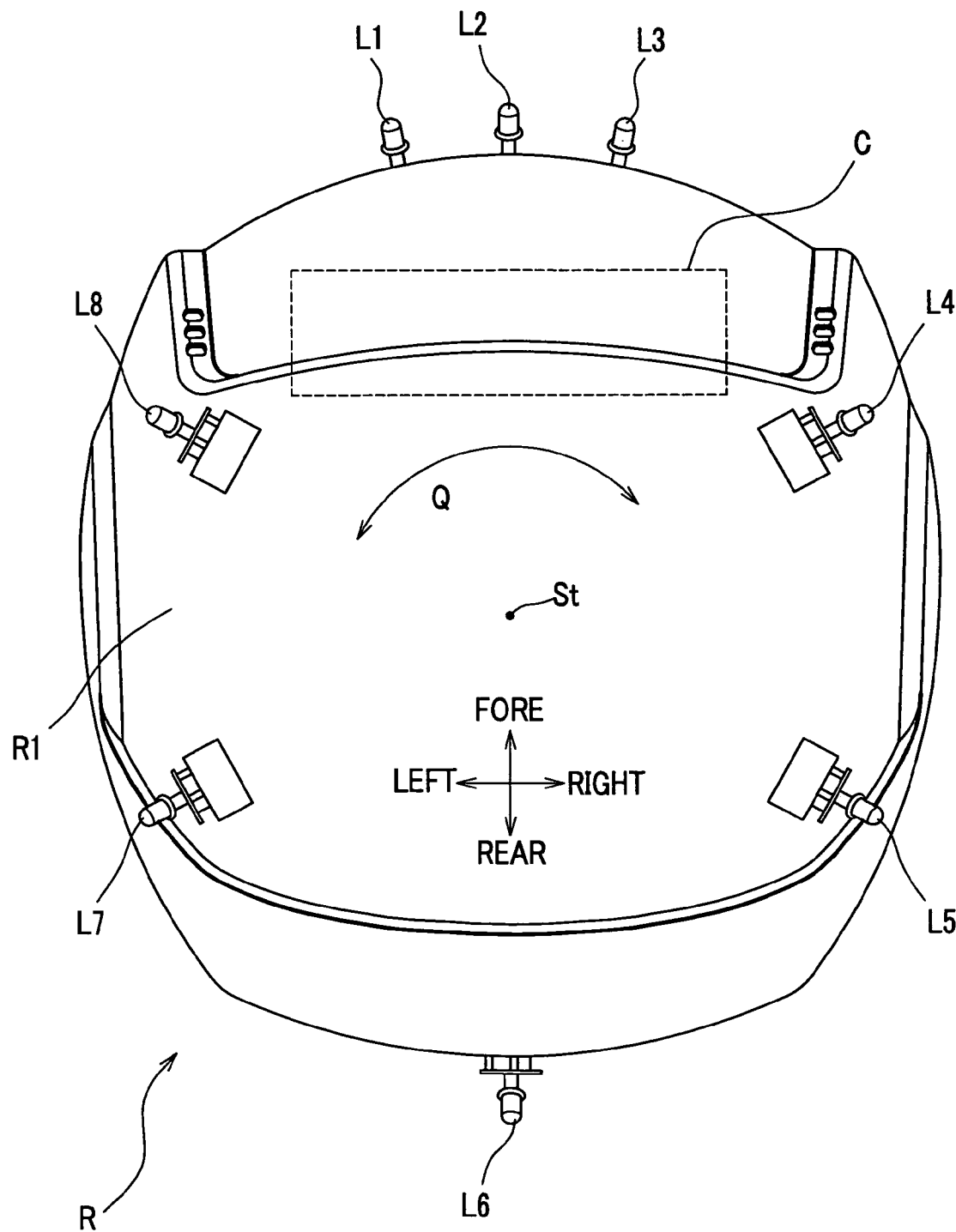
FIG. 2 is a plane view of the head part of the robot looked from an upper-side of the robot.

As shown in FIGS. 1 and 2, a total of eight light emitters (L1-L8) are provided on the head part R1 of the robot R, and a light emitting diode (LED) which can irradiate an infrared light signal is used as the light emitter. In FIG. 2, for convenience of explanation, each light emitter (L1-L8) protrudes from the surface of the head part R1 of the robot R. But, actually, tip of each light emitter (L1-L8) is flush with the surface of the head part R1 of the robot R. That is, tip of each light emitter (L1-L8) does not protrude from the surface of the head part R1.

A pair of cameras C and C which serve as an image pickup device is provided on the head part R1. The camera C acquires images in a form of digital format, and a color CCD (Charge-Coupled Device) camera is, for example, adopted as the camera C. As shown in FIG. 1, cameras C, C are provided on the head part R1 and are arranged in a line along a lateral direction. Here, each light emitter (L1-L8) is disposed above the cameras C, C.

In this embodiment, as shown in FIG. 1, a direction orthogonal to a ground plane F of the robot R, that is a vertical direction to the ground plane F, is defined as a reference axis St.

If it is assumed that the reference axis St passes the center of the robot R, each light emitter (L1-L8) is arranged around the reference axis St (see FIG. 1).

As shown in FIG. 2, the reference axis St is established that the reference axis St passes the center of the head part R1. Here, light emitters L1-L3, the light emitter L6, light emitters L4 and L5, and light emitters L7 and L8 are disposed in a front side, a rear side, a right side, and left side, respectively. Here, a height from the ground plane F of respective light emitters L1-L8 is not exactly the same one another when the robot R is directed to a fore side. The height from the ground plane F of respective light emitters L1-L8 may be varied in a height direction.

Here, the detailed explanation of the monitoring device W of the present embodiment will be made with reference to the application example (target object detection system A) shown in FIG. 3.

Figure 3:
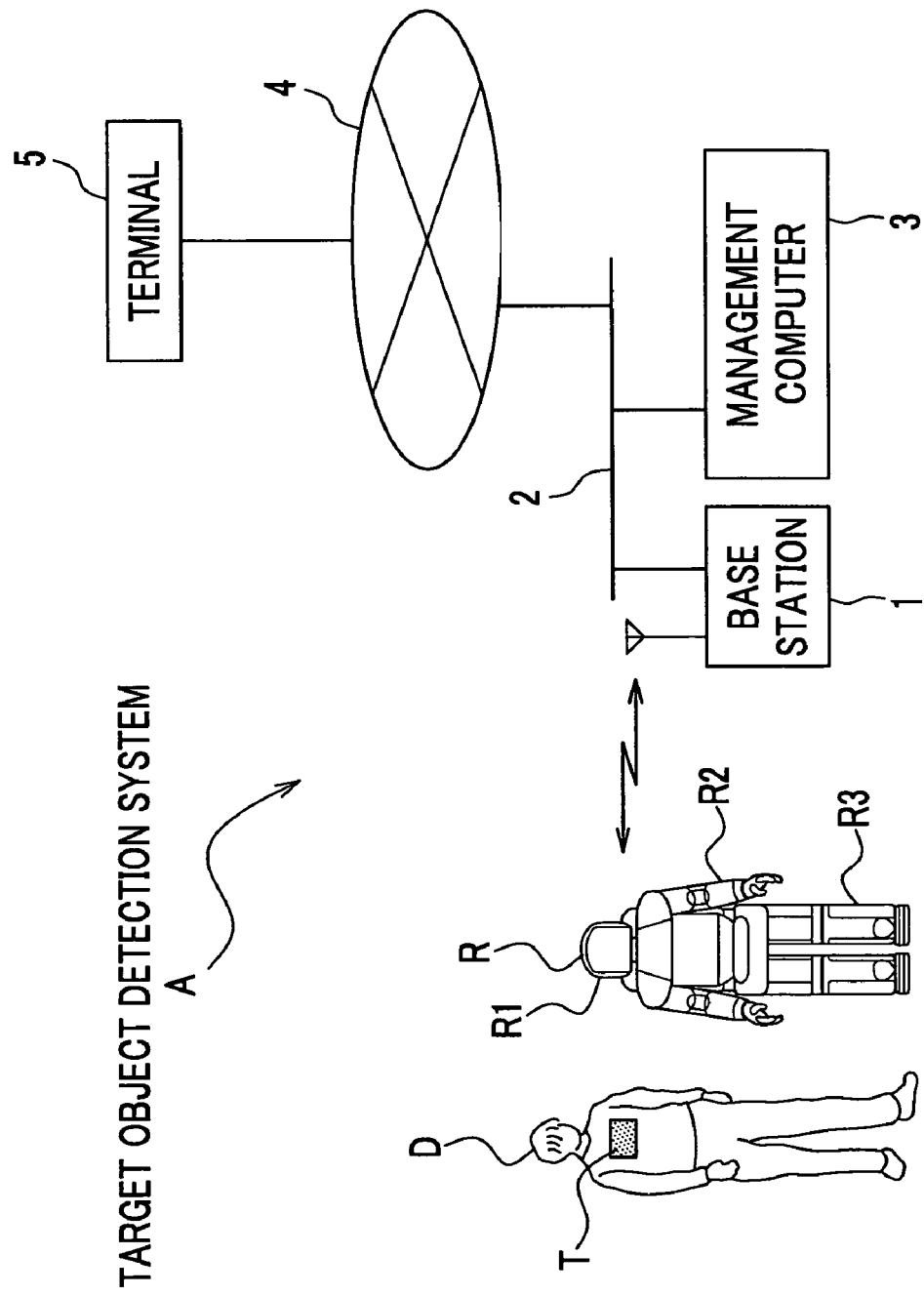
FIG. 3 is a block diagram of a target object detection system A, which is an application example of the outside monitoring device.

As shown in FIG. 3, in the target object detection system A, a detector, e.g. robot R, detects a target object D, i.e. a person with a tag T, exists within a surrounding area of the robot R. The robot R measures a direction and distance of the target object D with respect to the robot R and determines the position of the target object D. That is, at least the following points are checked by the robot R: (1) how far the target object D is apart from the robot R; (2) which direction the target object D exists in.

Especially, which direction the target object D exists in is measured in first and second embodiments of the present invention.

As shown in FIG. 3, the target object detection system A includes a robot R, a base station 1, a management computer 3, a terminal 5, and a tag T. In this system A, the robot R communicates with the base station 1 by wireless communication. The base station 1 connects with the management computer 3 through a robot network 2. The management computer 3 connects with the terminal 5 through a network 4. The tag T is attached to the target object D. In this embodiment, the target object D corresponds to a person with the tag T In the target object detection system A, the robot R detects a presence of the target object D, e.g. a person with the tag T, and measures the position of the detected target object D. The robot R further performs a personal identification with respect to the detected target object D. That is, who is the detected target object D is detected by the robot R.

The management computer 3 performs the control of the base station 1 and controls the motion, e.g. a travel and a speech, of the robot R through the robot network 2. The management computer 3 exchanges essential information (data) with the robot R.

In this embodiment, for example, a name of a person (target object D) and a map (map information) of the area where the robot R moves around correspond to the essential information. The essential information is stored in a recording means (not shown) provided in the management computer 3.

The robot network 2 connects the base station 1, the management computer 3, and the network 4 one another, and can be represented by LAN. The terminal 5 connects with the management computer 3 through the network 4 and is used for the input and update of information, e.g. a tag T and a person (target object D) having a tag T. Here, an IC tag corresponds to the tag of the present embodiment.

Next, the construction of the robot R and the target object D (tag T) will be explained.

Figure 4:
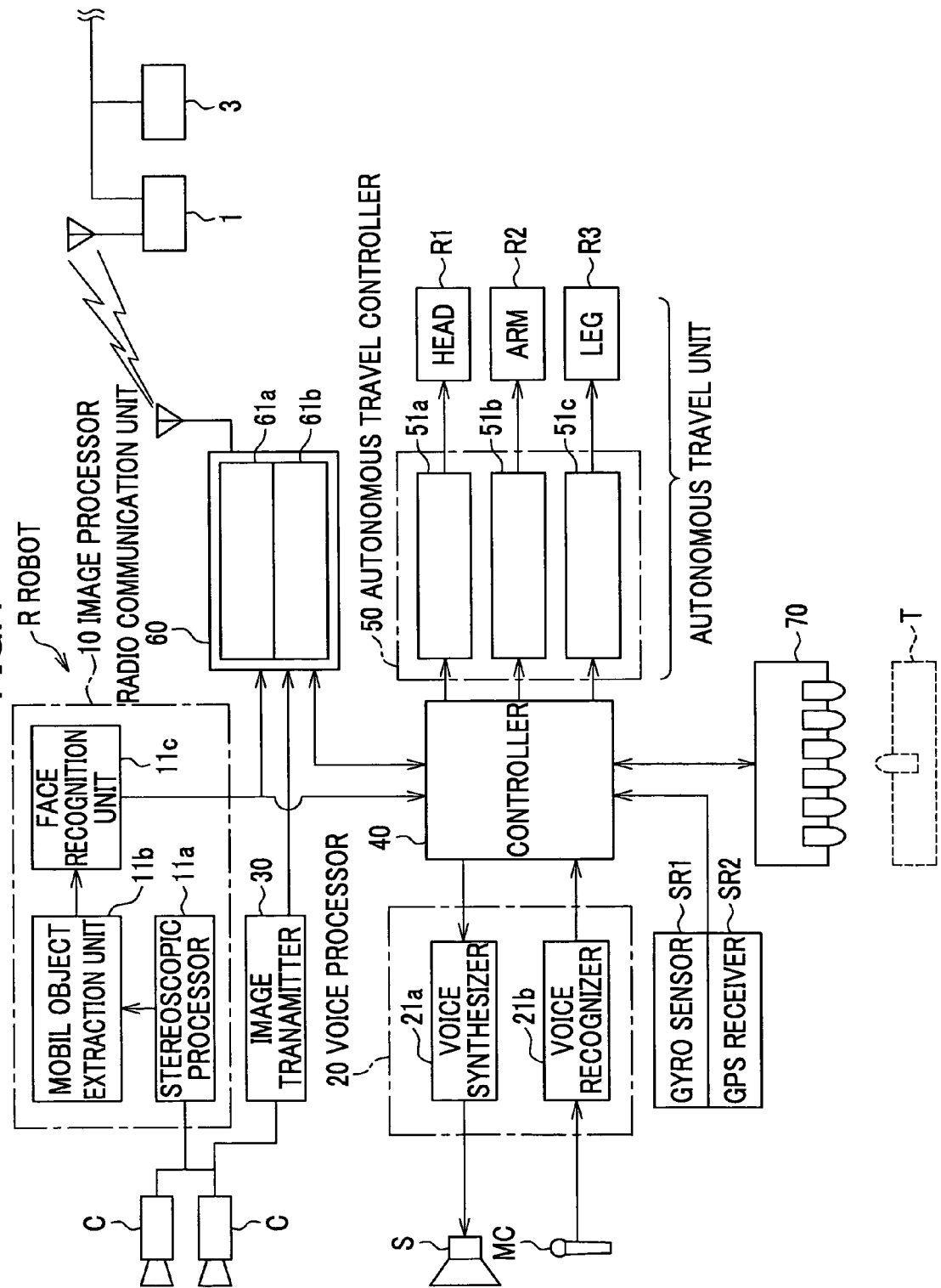
FIG. 4 is a block diagram of the robot.

As shown in FIG. 4, the robot R of the present embodiment includes a speaker S, a microphone MC, an image processor 10, a voice processor 20, an image transmitter 30, a controller 40, an autonomous travel controller 50, a radio communication unit 60, and a target detection unit 70 in addition to light emitters (L1-L8) and cameras C and C. The robot R further includes a gyro sensor SR1 and a GPS receiver SR2 for measuring the position of the robot R.

The image processor 10 performs recognition of a person and an obstacle in the surrounding area, in order to recognize the condition of the surrounding area of the robot R based on the image acquired by the cameras C, C. This image processor 10 includes a stereoscopic processor 11a, a mobile object extracting unit 11b, and a face recognition unit 11c.

The stereoscopic processor 11a performs a pattern matching between images obtained from each camera C on the basis of one of two images acquired by the cameras C, C. In this embodiment, since the robot R has two cameras (a left-side camera and a right-side camera), one of two images is the image obtained from left-side camera and the other of two images is the image obtained from right-side camera. Thus, the pattern patching is performed between the image obtained from left-side camera and the image obtained from right-side camera.

Then the stereoscopic processor 11a computes a parallax between two images to generate a parallax image, and outputs a parallax image to the mobile object extracting unit 11b together with the image entered from the cameras C and C. Here, the computing of the parallax is performed between corresponding pixels in two images. In the parallax image, the distance from the robot R (camera C) to the target object is indicated by the difference of the brightness.

The mobile object extracting unit 11b extracts a mobile (moving) object from the image obtained by the camera C, based on data entered from the stereoscopic processor 11a. The reason why the extraction of the mobile object is performed is to perform the recognition of a person on the assumption that it is more likely that the moving object is a person.

The mobile object extracting unit 11b performs the pattern matching in order to extract the mobile object, and computes a distance for corresponding pixels in two images to generate a distance image. Here, the pattern matching is performed by comparing the current frame (image), which was obtained currently by the camera C, with the last frame (image), which is generated from several frames obtained prior to the acquisition of the current frame.

Then, the mobile object extracting unit 11b, based on the distance image and the parallax image, searches the pixels whose shift amount is large, from among the pixels within a predetermined distance from the cameras C, C (robot R). If such pixel exists, the mobile object extracting unit 11b considers that a person is within the pixels (distance), and extracts a mobile object from the image entered from the camera based on the distance image and the parallax image The face recognition unit 11c extracts a human body color region from the extracted mobile object, and computes position of the face of a human in consideration of a size and shape of the extracted human body color region. The position of a hand is also computed by the same method.

The position of the recognized face is supplied to the controller 40 for communicating with a person and for actuating the robot R. Additionally, the position of the recognized face is supplied to the radio communication unit 60 in order to supply to the management computer 3 through the base station 1.

As shown in FIG. 4, the voice processor 20 includes a voice synthesizer 21a and a voice recognizer 21b.

The voice synthesizer 21a generates voice data from text information, based on a command, which commands the robot R to have a conversation with a human or to sound a voice message and which is entered from the controller 40. Then, the voice synthesizer 21a outputs voice data to the speaker S. Here, the generation of voice data is, for example, performed by utilizing the correspondence between voice data and text information stored beforehand in a recording unit (not shown). The voice recognizer 21b generates text information from voice (sound) data, based on the correspondence between voice data and text information stored beforehand in the recording unit (not shown). Then, the voice recognizer 21b outputs text data to the controller 40.

The image transmitter 30 outputs image data entered from the camera C, C to the management computer 3 through the radio communication unit 60.

The autonomous travel controller 50 includes a head controller 51a, an arm controller 51b, and a leg controller 51c. The head controller 51a actuates the head part R1 based on a command entered from the controller 40. The arm controller 51b actuates the arm part R2 based on a command entered from the controller 40. The leg controller 51c actuates a leg part R3 based on a command entered from the controller 40.

The head part R1 is turnably supported on the body part R4 of the robot R and is adapted to turn along an alignment direction Q of light emitters (L1-L8) (See FIG. 1 or FIG. 2). The head controller 51a, in compliance with a command signal from the controller 40, controls the turn along an alignment direction Q of the head part R1. That is, the head part R1 turns in a clockwise or anti-clockwise direction together with the cameras C and C while keeping the horizontal location of cameras C and C, under the control of the head controller 51a.

Additionally, an actuation unit which turns the head part R1 in an obliquely upward or downward direction may be provided on the robot R. Here, since various kinds of well-known units can be adopted as this actuation unit, the detailed explanation thereof will be omitted in this explanation.

Additionally, data obtained by the gyro sensor SR1 and the GPS receiver SR2 is supplied to the controller 40, and is used for deciding the motion of the robot R. Also, the same data is supplied to the management computer 3 through the radio communication unit 60.

The radio communication unit 60 exchanges data with the management computer 3. The radio communication unit 60 includes a public line communication unit 61a and a radio communication unit 61b.

The public line communication unit 61a performs a wireless communication by using a cellular phone line or a personal handyphone system. The radio communication unit 61b performs a wireless communication by using a short-range wireless communication technique, e.g. a wireless local area network complying with IEEE802.11b standard.

The radio communication unit 60 performs a data exchange with the management computer 3 using one of the public line communication unit 61a and the radio communication unit 61b, when a signal which commands the robot R to communicate with the management computer 3 is entered from the management computer 3.

The target detection unit 70 detects a presence of the target object D with (having) the tag T within a surrounding area of the robot R, and computes the position of the target object D when the target object D exists in the surrounding area.

Figure 5:
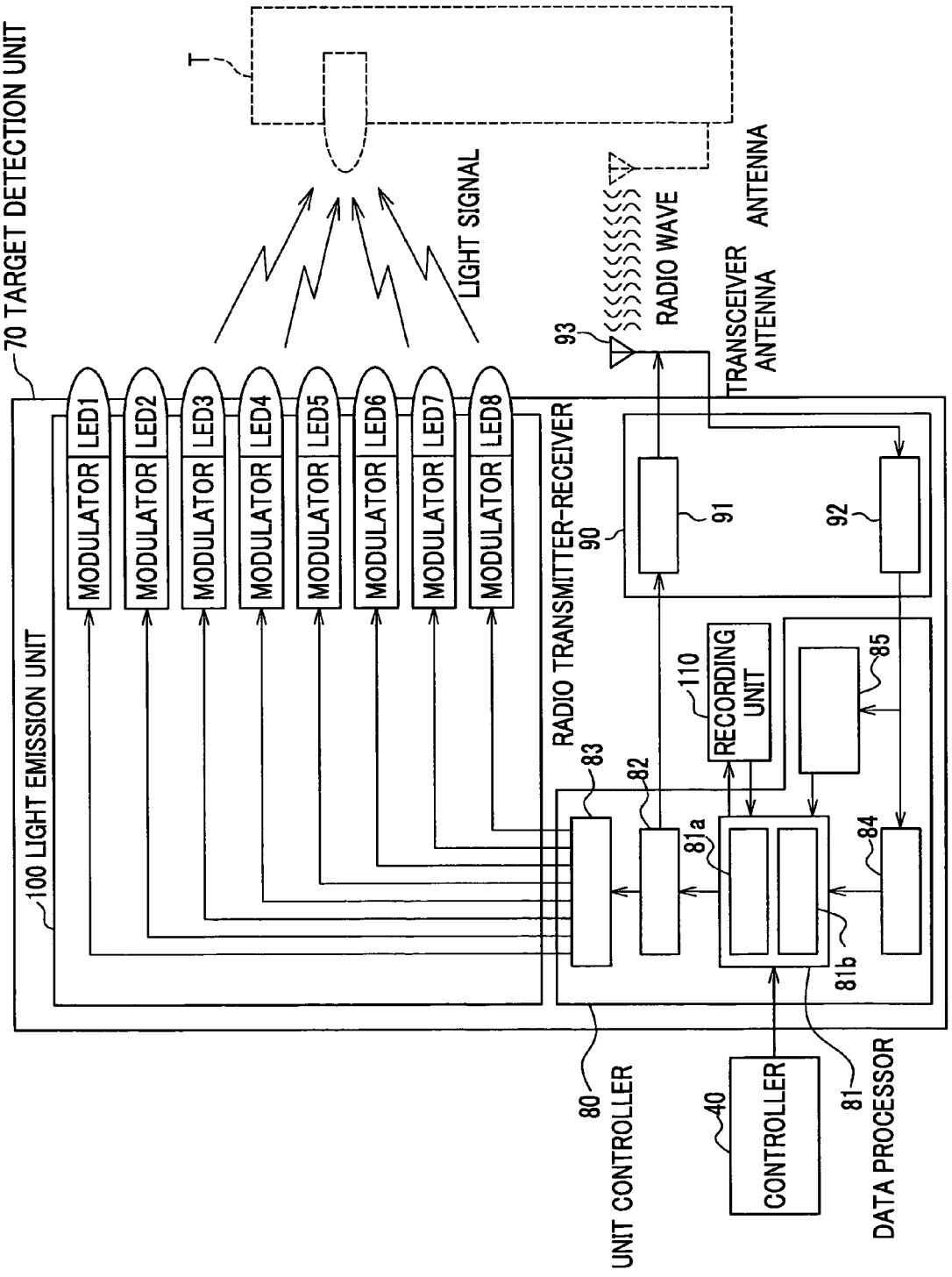
FIG. 5 is a block diagram of a target detection unit.

As shown in FIG. 5, the target detection unit 70 includes a unit controller 80, a radio transmitter-receiver 90, a light emission unit 100, and a recording unit 110.

The unit controller 80 generates a search signal to be transmitted from the radio transmitter-receiver 90, and a direction check signal which is emitted as an infrared light from the light emission unit 100.

The unit controller 80, additionally, determines the position of the target object D based on a receipt signal, which is transferred from the tag T when the tag T has received the search signal.

Here, the search signal is a signal to be used for checking whether or not the target object D exists in the surrounding area of the robot R, and the direction check signal is a signal to be used for checking which direction with respect to the robot the target object D exists in. The receipt signal is a signal which indicates that the tag T has received at least the search signal.

The unit controller 80 includes a data processor 81, an encryption unit 82, a time division unit 83, a decoder 84, and a field intensity measuring unit 85.

The data processor 81 generates the search signal and the direction check signal, and determines the position of the target object D. The data processor 81 includes a signal generator 81a and a position computing part 81b.

The signal generator 81a obtains a robot ID from the recording unit 110 at a predetermined cycle or when a signal (a transmission request signal), which requests the transmission of radio wave, is entered from the controller 40. Here, the robot ID is a unique identification number of the robot R, in which the target detection unit 70 is installed.

Then the signal generator 81a generates a search signal which includes the robot ID and receipt request signal. Here, the receipt request signal is a signal which commands the target object D (tag T) to generate the receipt signal when the target object D (tag T) receives the search signal.

The signal generator 81a generates the direction check signal, which is emitted as an infrared light signal from the light emission unit 100, when the search signal is generated.

The direction check signal is generated for each light emitter (L1-L8) of the light emission unit 100, separately, and includes an emitter ID, which is a unique identification number for identifying the light emitter (L1-L8). Here, the direction check signal including the emitter ID corresponds to a light signal to be transmitted from the robot R to the tag T. In this embodiment, this direction check signal is also generated, when the receipt signal entered from the decoder 84 includes an emission request signal.

In the present embodiment, since total of eight light emitters (L1-L8) is provided on the robot R, the data processor 81 generates total of eight direction check signal, which includes a robot ID and the emitter ID.

For example, if it is assumed that the robot ID is "02" (robot ID=02) and that the emitter ID of light emitters (from L1 to L8) is from "D1" to "D8", the direction check signal to be generated for the light emitter L1 includes the robot ID whose ID is "02" and the emitter ID whose ID is "D1". Additionally, the direction check signal to be generated for the light emitter L2 includes the robot ID whose ID is "02" and the emitter ID whose ID is "D2".

Then, the signal generator 81a outputs the direction check signal and the search signal to the encryption unit 82.

Here, the position computing part 81b of data processor 81 measures the position of the target object D based on the receipt signal transmitted from the tag T which has received the search signal. The detailed explanation of the signal processing in the position computing part 81b will be made later together with the signal processing in the field intensity measuring unit 85 and the decoder 84.

The encryption unit 82 encrypts the signal entered to the encryption unit 82, and outputs the encrypted signal. To be more precise, the encryption unit 82 outputs the encrypted search signal, which is obtained by the encryption of the search signal, to the radio transmitter-receiver 90. Thereby, the encrypted search signal is modulated and is transmitted from the radio transmitter-receiver 90.

The encryption unit 82 encrypts the direction check signal entered from the data processor 81 to obtain the encrypted direction check signal, and outputs the encrypted direction check signal to the time division unit 83.

In this embodiment, the direction check signal is generated to each light emitter of the light emission unit 100.

As shown in FIG. 5, since the light emission unit 100 has a total of eight light emitters, a total of eight direction check signals are generated in the encryption unit 82 and are entered to the time division unit 83.

The time division unit 83 determines the order of the emission of light emitters (L1-L8) of the light emission unit 100 and the timing of the emission of each light emitter (L1-L8).

To be more specific, the time division unit 83 determines the order and timing of the emission of each light emitter (L1-L8) when the encrypted direction check signal is entered from the encryption unit 82. Then, the time division unit 83 outputs the encrypted direction check signal to the light emission unit 100 based on the order and timing which were determined.

For example, if it is determined that each light emitter is emitted at 0.5 sec interval in order of the light emitter L1, the light emitter L5, the light emitter L2, the light emitter L6, the light emitter L3, the light emitter L7, the light emitter L4, and the light emitter L8, the time division unit 83 outputs the encrypted direction check signal, at 0.5 sec interval, to the modulator of each light emitter (L1-L8) That is, the time division unit 83 outputs the encrypted direction check signal, at 0.5 sec interval, in order of: the modulator of the light emitter L1; the modulator of the light emitter L5; the modulator of the light emitter L2; the modulator of the light emitter L6; the modulator of the light emitter L3; the modulator of the light emitter L7; the modulator of the light emitter L4; the modulator of the light emitter L8.

In this embodiment, a total of eight encrypted direction check signal is entered to the time division unit 83, and the light emitter, to which each encrypted direction check signal is supplied, is determined beforehand in the data processor 81.

The time division unit 83, therefore, checks the emitter ID included in the encrypted direction check signal when the encrypted direction check signal is entered, and outputs the encrypted direction check signal to the modulator of the light emitter, which is specified by the emitter ID, at the determined order and timing.

For example, if the emitter ID of light emitter (L1-L8) is from D1 to D8, the time division unit 83 supplies the encrypted direction check signal, which includes emitter ID="D1", to the modulator of the light emitter whose emitter ID is "D1". Additionally, the time division unit 83 supplies the encrypted direction check signal, which includes emitter ID="D2", to the modulator of the light emitter whose emitter ID is "D2".

The light emission unit 100 emits a light to detectable regions (Sa1-Sa8), which are established around the robot R based on the position of the robot R.

Figure 6B:
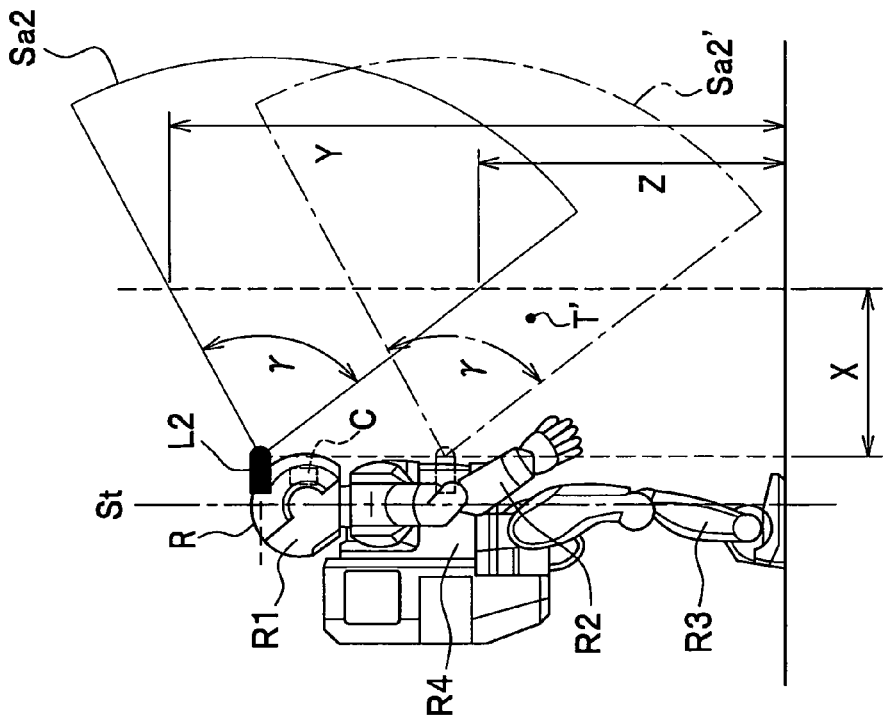
FIG. 6B is an explanatory view of an irradiation range in a height direction of an infrared light irradiated from the light emitter of the light emission unit.
Figure 6A:
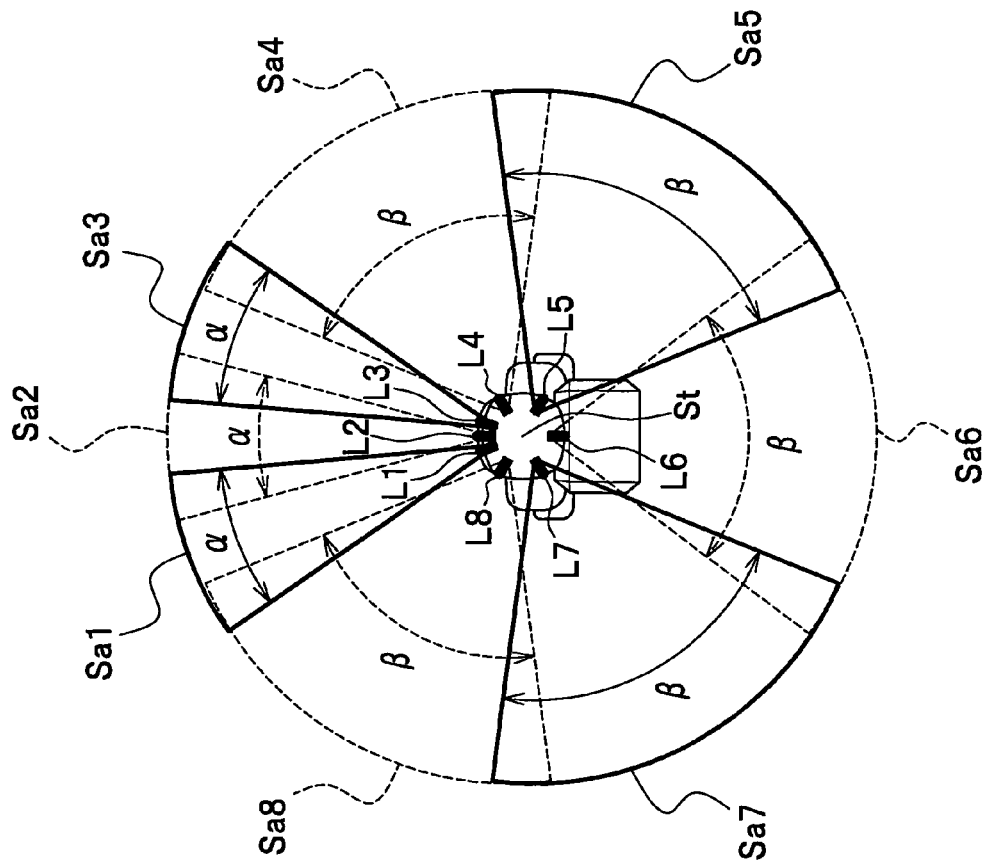
FIG. 6A is an explanatory view of a detectable region established around the robot R.
Figure 7:
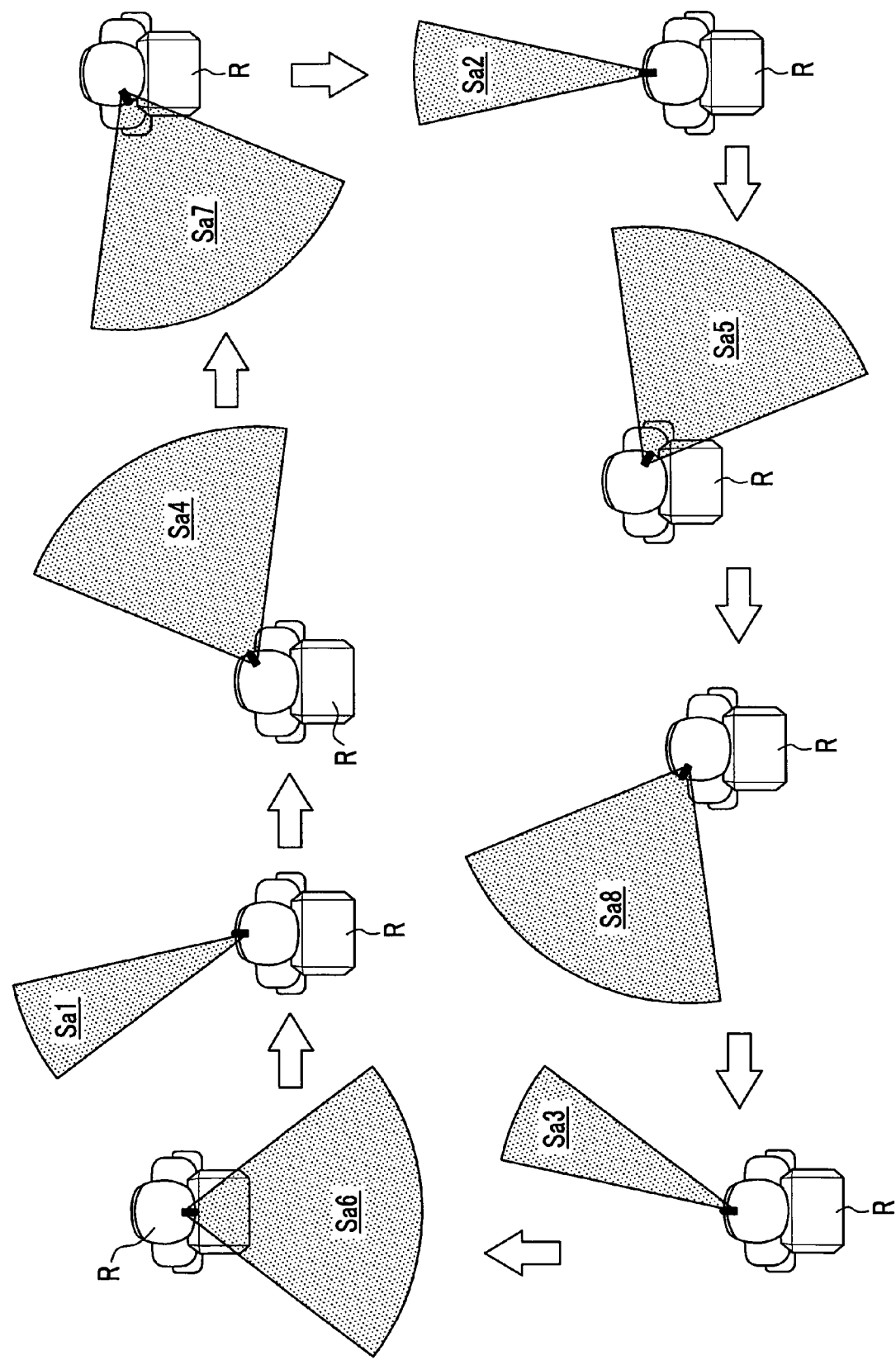
FIG. 7 is an explanatory view of the actuation order of each light emitter provided on the robot.

Referring to FIGS. 5 and 6A, the light emission unit 100 includes a plurality of light emitter (L1-L8) and modulators provided to each light emitter. The modulator modulates the encrypted direction check signal entered from the time division unit 83 to obtain a modulated signal. Each light emitter (L1-L8) emits the modulated signal as an infrared light signal (infrared light) to the predetermined detectable region (Sa1-Sa8).

As shown in FIG. 6A, respective light emitters (L1-L8) are respectively assigned to predetermined detectable regions (Sa1-Sa8). To be more precise, light emitters (L1-L3) and light emitters (L4-L8) are assigned to detectable regions (Sa1-Sa3) and detectable regions (Sa4-Sa8), respectively. In this embodiment, an angular range α of each detectable region (Sa1-Sa3) is established at a smaller value than an angular range β of each detectable region (Sa4-Sa8).

This is because of the following reason. That is, when the robot R detects the presence of the target object D and directs the face of the robot R to the detected target object D, if the direction of the face of the robot R does not agree with the direction of the target object, the target object D (person) may feel that the robot R is not directing his face toward the target object D.

For preventing the occurrence of such situation, it is preferable to increase the number of detectable regions, but is not necessarily to increase the number of the detectable regions along 360-degree direction. The occurrence of such situation can be prevented by only increasing the numbers of the detectable regions which are positioning in front of the robot R. By adopting this manner, the position detection in a front-side of the robot R can be achieved with accuracy and the numbers of the light emitter can be curbed.

Therefore, in this embodiment, the position detection with sufficient accuracy of the target object D within each detectable region (Sa1-Sa3) is enabled, by narrowing the irradiation range of an infrared light with respect to respective detectable regions (Sa1-Sa3) which are located in front of the robot R.

Thus, the position detection of the person can be achieved with accuracy, if the target object D is a person and an image pickup of a face image of the person is performed by cameras C, C of the robot R. In this case, the cameras C, C of the robot R can be directed to the face of the person as the target object D. Since the result of the position detection can reflect on the motion control of the robot R and the adjustment of an angle of cameras C, C, the cameras C, C of the robot R can be directed to the face of the person as the target object D.

In this embodiment, additionally, the state of the surrounding area, i.e. 360 degree direction's state, can be monitored at a time, by establishing detectable regions (Sa1-Sa8) around the robot R.

Therefore, the detection of the target object D can be achieved even if the target object with tag T does not exist in front of the cameras C and C.

In this embodiment, additionally, in order to minimize the region excluded from the detectable region, i.e. to minimize a dead space in the surrounding area, the range of the detectable region is determined so that adjoining detectable regions overlap each other at edge.

In this case, however, the interference of an infrared light may be caused at the overlapping edge of detectable regions (Sa1-Sa8), when an infrared light is irradiated to the adjoining detectable regions consecutively or simultaneously.

In this embodiment, therefore, the output order and timing of the encrypted direction check signal from the time division unit 83 of the unit controller 80 is adjusted, in order to prevent the occurrence of an interference of an infrared light that is caused when an infrared light is irradiated to the adjoining detectable regions consecutively.

Referring to FIG. 5, in this embodiment, the time division unit 83 adjusts the output order and timing of the encrypted direction check signal so that the irradiation of the infrared light is performed in order of: the detectable region Sa1, the detectable region Sa4, the detectable region Sa7, the detectable region Sa2, the detectable region Sa5, the detectable region Sa8, the detectable region Sa3, the detectable region Sa6, the detectable region Sa1.

In this embodiment, as shown in FIG. 6B, an irradiation range in a height direction of an infrared light is determined so that the presence of a person, e.g. a person from a child to an adult, can be detected at a distance X. Here, distance X is determined based on an average distance wherein interpersonal communication is available. Thus, distance X is a distance from a robot R wherein an inter-communication between the robot R and a person can be achieved. Here, in FIG. 6*b*, only light emitter L2 is shown in figure, but the irradiation range in a height direction of the infrared light of the other light emitter (L1, L3-L8) is the same as that of light emitter L2.

To be more precise, an irradiation range in a height direction of an infrared light is determined so that a height Y which corresponds to an average height of a breast of the adult person, and a height Z which corresponds to an average height of a breast of a child are surely irradiated by an infrared light. In this embodiment, an angle α which is irradiation angle in a height direction of the infrared light is determined so as to satisfy this requirement.

The radio transmitter-receiver 90 transmits radio wave toward a surrounding area of the robot R, and receives a receipt signal transmitted from the target object D which has received the radio wave.

The radio transmitter-receiver 90 includes a modulator 91, a demodulator 92, and a transceiver antenna 93.

The modulator 91 modulates the encrypted search signal, which is entered from the data processor 81 through the encryption unit 82, to generate a modulated signal, and transmits the modulated signal through the transceiver antenna 93.

The demodulator 92 receives the modulated signal transmitted by wireless from the tag T of the target object D, and obtains the encrypted receipt signal by demodulating the modulated signal.

Then, the demodulator 92 outputs the encrypted receipt signal to the decoder 84 and the field intensity measuring unit 85 of the unit controller 80.

The decoder 84 obtains the receipt signal by decoding the encrypted receipt signal, which was generated by coding the receipt signal, and outputs the receipt signal to the data processor 81.

In this embodiment, since the receipt signal includes at least the emitter ID, the robot ID, and a tag ID, the decoder 84 outputs these IDs to the data processor 81. Here, the tag ID is a unique identification number for identifying the tag which has transmitted the receipt signal. Additionally, if the receipt signal includes the emission request signal, the decoder 84 also outputs the emission request signal to the data processor 81.

The field intensity measuring unit 85 measures an intensity of the modulated signal, when the modulated signal transmitted from the tag T of the target object D is received by the radio transmitter-receiver 90. To be more precise, the field intensity measuring unit 85 detects a power of the encrypted receipt signal, which is entered from the demodulator 92 of the radio transmitter-receiver 90, and computes an average of the detected power. Then, the field intensity measuring unit 85 outputs the computed average value as the data of the field intensity to the data processor 81.

The position computing part 81b of the data processor 81b determines the position of the target object D. To be more specific, the position computing part 81b computes the distance to the target object D from the robot R based on the field intensity of the modulated signal, which is received in the radio transmitter-receiver 90 and is transmitted from the tag T of the target object D.

The position computing part 81b, additionally, refers to the emitter ID included in the receipt signal, and identifies the light emitter which has emitted an infrared light received by the target object D based on the emitter ID. Then, the position computing part 81b regards the direction of the detectable region to which the light emitter identified by the emitter ID has irradiated an infrared light, as the direction of the target object. Thereby, the position (direction) of the target object can be identified.

In this embodiment, as described above, a plurality of light emitter (L1-L8) is provided on the head part R1 of the robot R and is correlated with corresponding detectable region (Sa1-Sa8). That is, since directivity is established on the light emitter, the direction of the target object D with tag T can be measured accurately.

Additionally, the direction of the target object D can be measured by simple processing, i.e. the direction of the target object D can be measured by detecting an emitter ID (D1-D8) assigned to the light emitter (L1-L8). Thus, a complicated-processing, which is required when performing the detection of the target object D using cameras C and C, is not required.

In this embodiment, the position computing part 81b firstly obtains the robot ID from the receipt signal entered from the decoder 84. Then, the position computing part 81b compares the obtained robot ID with the robot ID stored in the recording unit 110. If both robot IDs are the same, the position computing part 81b starts the position detection.

Figure 8:
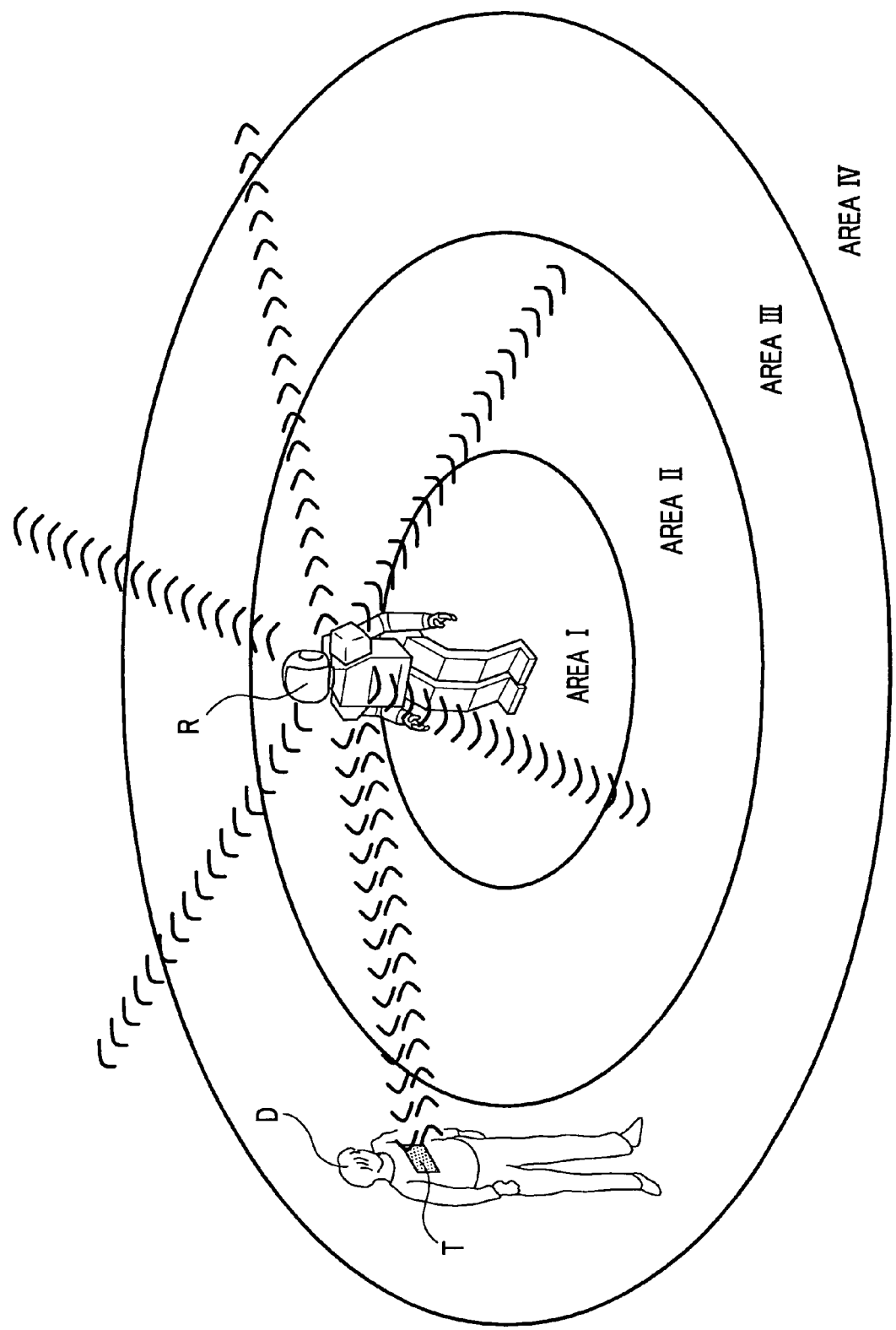
FIG. 8 is an explanatory view of the measurement of the distance between the robot and the target object.

In this embodiment, as shown in FIG. 8, the surrounding area of the robot R is divided into four areas depending on the distance from the robot R. That is, an area I, an area II, an area II, and an area IV are established around the robot R.

In this embodiment, each area is beforehand correlated with the field intensity on the basis of a value of field intensity, and a table (a distance table) which indicates the correlation between the area and the field intensity is stored in the recording unit 110.

Therefore, the position computing part 81b refers to the distance table based on the field intensity entered from the field intensity measuring unit 85, and obtains information (area information) which indicates which area among areas (from area I to area IV) the target object D, which has the tag T that has transmitted the receipt signal exists in.

Here, for example, if the field intensity E1 entered from the field intensity measuring unit 85 is between threshold values E2 and E3 (here, E2 is a lower limit of the area III and E3 is an upper limit of the area III), the position computing part 81b obtains the area information which indicates the area III.

The position computing part 81b refers to the emitter ID included in the receipt signal entered from the decoder 84, and identifies the light emitter which has emitted an infrared light received by the target object D based on the emitter ID. Then, the position computing part 81b obtains information (direction information) which indicates the irradiation direction of the infrared light from the identified light emitter.

Figure 9:
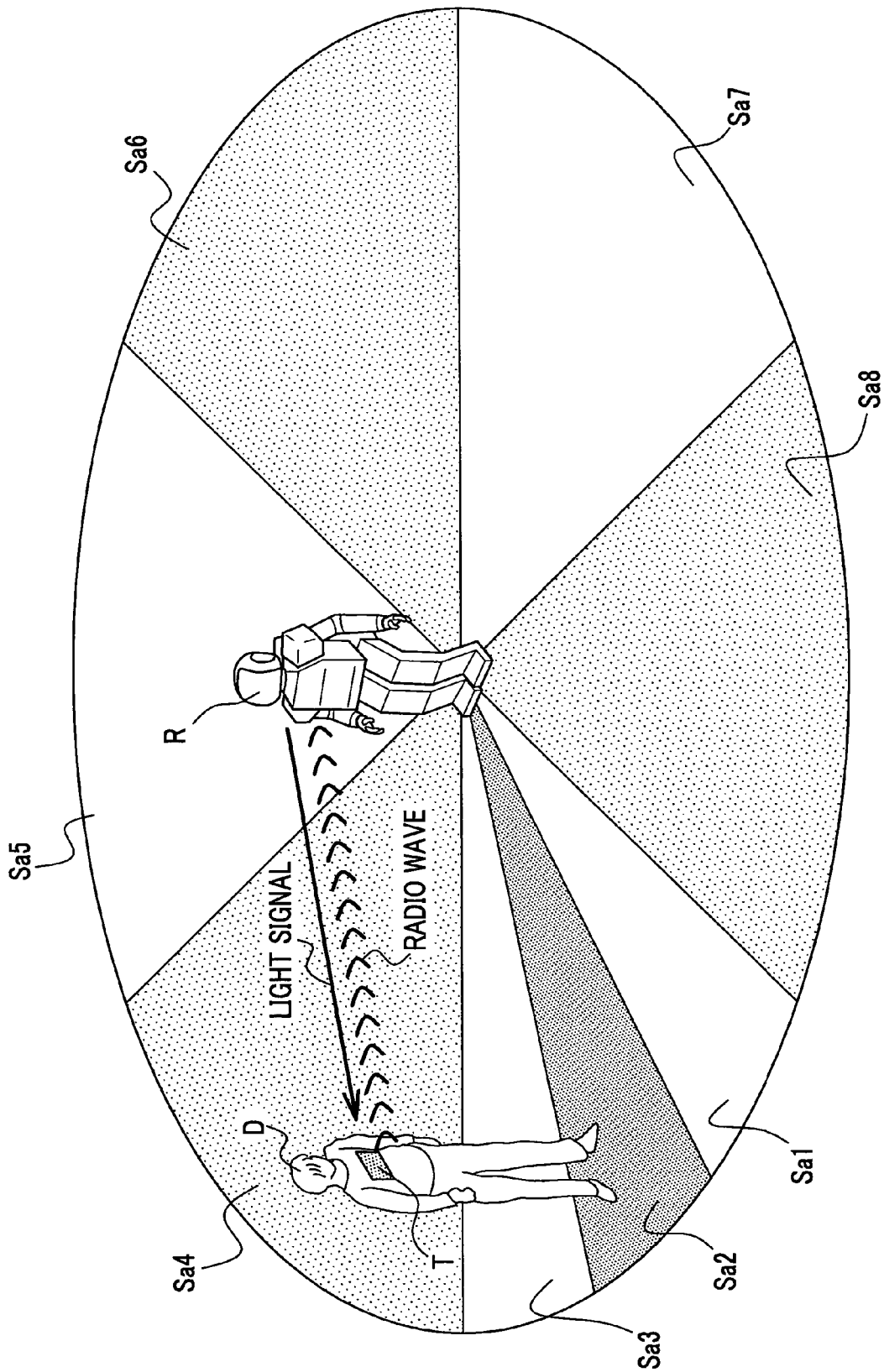
FIG. 9 is an explanatory view for measuring the direction of the target object.

In this embodiment, as shown in FIG. 9, a total of eight detectable regions (Sa1-Sa8) are established in the surrounding area of the robot R, and the recording unit 110 stores a table (a direction table) which indicates the detectable region to which each light emitter is being directed.

Therefore, the data processor 81 refers to the direction table stored in the recording unit 110 based on the emitter ID, and recognizes the detectable region to which the light emitter identified by the emitter ID has irradiated an infrared light. That is, the detectable region to which infrared light has been irradiated is determined from among predetermined detectable regions (Sa1-Sa8).

Then, the data processor 81 obtains information indicating the identified detectable region as the information (direction information) which indicates the direction of the target object D.

In this embodiment, adjoining detectable regions overlap each other at edge, but the overlapping edge of each detectable region (Sa1-Sa8) is omitted from this FIG. 9. This omission of the overlapping edge is the same as FIG. 10.

The position computing part 81b basically generates information (position information) which indicates the position of the target object D from area information and direction information.

Figure 10:
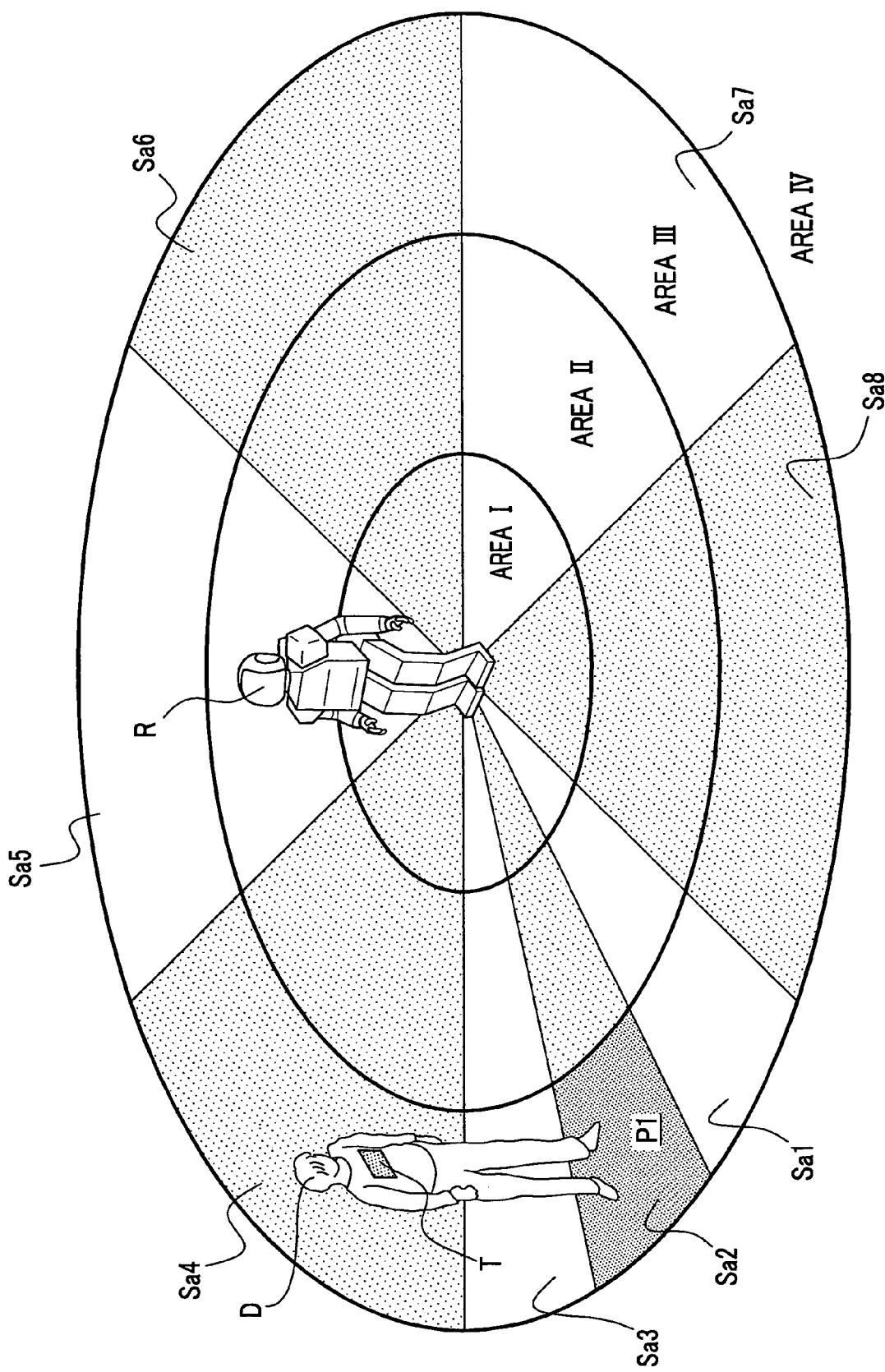
FIG. 10 is an explanatory view for determining the position of the target object.

Here, the explanation of position information will be made with reference to FIG. 10. FIG. 10 corresponds to a figure which is formed by the overlay of FIG. 8 and FIG. 9.

If the content of area information is "AREA III" and the content of direction information is "Sa2", the data processor 81 regards the overlapping area between "AREA III" and "Sa2" as the position of the target object D, and generates information (position information) which indicates this overlapping area. Here, in FIG. 10, this overlapping area is denoted by a symbol P1.

As described above, the positional relation between the robot R and the target object D is determined based on the intensity of the receipt signal which has received by the robot R and the emitter ID included in the receipt signal. In other words, the direction and distance of the target object D is computed on the basis of the position of the robot R, and the position of the target object D can be determined.

Then, the position computing part 81b outputs the position information to the controller 40 of the robot R together with the tag ID included in the receipt signal entered from the decoder 84.

Thereby, the controller 40 of the robot R determines the motion of the robot R in consideration of the position information, and controls the motion of the autonomous travel controller 50 to actuate the robot R based on the determined motion.

In this embodiment, an autonomous travel of the robot to the front of the target object D or an image pickup of the face image of the target object D by adjusting an angle and direction of the camera C can be example as the motion of the robot R.

In this embodiment, the head part R1 provided with light emitters (L1-L8) is turnably supported on the body part R4 of the robot R and is adapted to turn along an alignment direction Q of light emitters L1-L8 (See FIG. 1 or FIG. 2). Thus, since the cameras C and C can be directed to the front of the target object D with ease, the image pickup of the target object D (face of a person) is enabled. Thereby, the accurate detection of the target object D can be performed based on an image obtained by the image pickup of the target object D, in addition to the direction of the target object D which is measured by the monitoring device.

Additionally, as shown in FIG. 6A, the target object D can be placed within the detectable regions (Sa1-Sa3) by turning the head part R1 even if the target object D is within the detectable region (Sa4-Sa8), when the detectable regions (Sa1-Sa3) are narrower than the other detectable regions (Sa4-Sa8). Thereby, the direction of the target object D can be measured accurately.

When the emission request signal is included in the receipt signal, the signal generator 81*a* generates the direction check signal and outputs the direction check signal to the encryption unit 82. Thereby, an infrared light is emitted from each light emitter of the light emission unit 100.

The controller 40 of the robot R transmits the tag ID to the management computer 3. Thereby, the management computer 3 refers to the recording unit (not shown) based on the tag ID when the tag ID is transferred from the robot R, and obtains information being correlated with the tag ID to perform the identification of the target object D with tag T. Then, the management computer 3 outputs the obtained information to the robot R together with a command signal which commands the robot R to make a predetermined motion. Thus, the controller 40 of the robot R controls each section, e.g. the autonomous controller 50, of the robot R based on the command signal.

The tag T receives radio wave and a light signal which are transferred from the robot R, and returns the receipt signal, which indicates the receipt of the radio wave or a light signal, to the robot R.

In this embodiment, because a person who has a tag T corresponds to the target object D, radio wave and light signal from the robot R is received by the tag T. Therefore, the explanation of the tag T will be made as follows.

Figure 11:
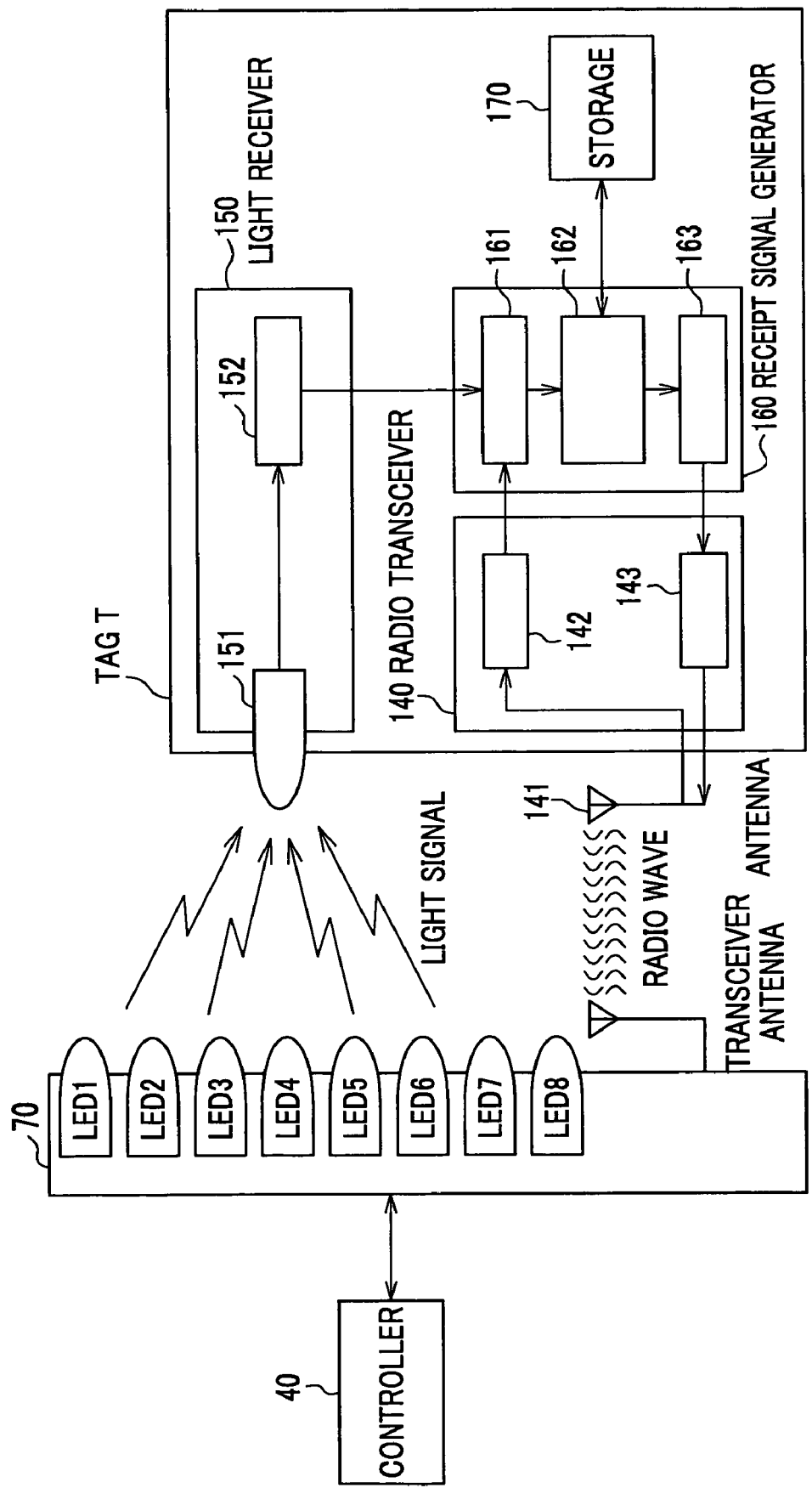
FIG. 11 is a block diagram of the tag T.

As shown in FIG. 11, the tag T includes a radio transceiver 140, a light receiver 150, a receipt signal generator 160, a storage 170.

The radio transceiver 140 receives the modulated signal transferred by wireless from the robot R, and transmits by wireless the modulated signal, which is obtained by modulating the receipt signal entered from the receipt signal generator 160, to the robot R. The radio transceiver 140 includes an antenna 141, a demodulator 142, and a modulator 143.

The demodulator 142 demodulates the modulated signal, which is transferred from the robot R and is received through the antenna 141, to obtain the encrypted search signal. Then, the demodulator 142 outputs the encrypted search signal to the receipt signal generator 160.

The modulator 143 modulates the encrypted receipt signal, which is entered from an encryption unit 163 of the receipt signal generator 160, to obtain a modulated signal. Then, the modulator 143 transmits the modulated signal to the robot R by wireless through the antenna 141.

The light receiver 150 receives the infrared light irradiated from the robot R.

The light receiver 150 includes an optical receiver 151 and a light demodulator 152.

The optical receiver 151 receives directly the infrared light (an infrared light signal) irradiated from the robot R. The light demodulator 152 demodulates the infrared light signal received by the optical receiver 151 to obtain the encrypted direction check signal.

To be more specific, when infrared light signal is received by the optical receiver 151, the light receiver 150 demodulates the infrared light signal to obtain the encrypted direction check signal. Then, the light receiver 150 outputs the encrypted direction check signal to the receipt signal generator 160.

The receipt signal generator 160 generates a signal (receipt signal), which indicates the receipt of the search signal from the robot R. In this embodiment, this receipt signal is generated in response to the receipt request signal included in the search signal, when the search signal (modulated signal) transferred from the robot R is received by the radio transceiver 140.

As shown in FIG. 9, the receipt signal generator 160 includes a decoder unit 161, a processor unit 162, and the encryption unit 163.

The decoder unit 161 decodes the encrypted signal to obtain the signal. That is, the decoder unit 161 decodes the encrypted search signal, which is entered from the radio transceiver 140, and the encrypted direction check signal, which is entered from the light receiver 150, to obtain the search signal and the direction check signal, respectively. Then, the decoder unit 161 outputs the search signal and the direction check signal to the processor unit 162.

The processor unit 162 generates the receipt signal. In this embodiment, the search signal includes the robot ID and the receipt request signal. Here, the robot ID is a unique identification number to specify the robot R which has transmitted the search signal. The receipt request signal is a signal which commands the target object D to perform the predetermined processing when the target object has received the search signal.

The direction check signal includes the robot ID for identifying the robot R which has emitted the direction check signal, and the emitter ID for identifying the light emitter which has emitted the direction check signal.

Thus, the processor unit 162 changes the condition of the light receiver 150 from a standby condition to an activated condition in response to the receipt request signal included in the search signal, when the search signal is entered to the processor unit 162.

The processor unit 162 compares the robot ID included in the direction check signal with the robot ID included in the search signal, when the processor unit 162 receives the direction check signal within a predetermined time after activating the light receiver 150.

The processor unit 162 obtains a unique identification number (tag ID) being assigned to the tag T from the storage 170, when the robot ID, which is included in the direction check signal, agrees with the robot ID, which is included in the search signal.

Then, the processor unit 162 generates the receipt signal in which the tag ID, the robot ID included in the search signal, and the emitter ID included in the direction check signal are included, and outputs the generated receipt signal to the encryption unit 163.

On the contrary, the processor unit 162 generates the receipt signal which further includes the emission request signal therein, if the direction check signal is not entered within a predetermined time after activating the light receiver 150 or if the robot ID of the direction check signal disagrees with the robot ID of the search signal. Then, the processor unit 162 outputs the generated receipt signal to the encryption unit 163. Here, the emission request signal is a signal which commands the robot R (detection unit) to emit an infrared light.

The encryption unit 163 encrypts the receipt signal to generate the encrypted receipt signal, and outputs the encrypted receipt signal to the radio transceiver 140.

Thereby, the encrypted receipt signal is modulated in the modulator 143 of the radio transceiver 140 and then transferred by wireless through the antenna 141.

In this embodiment, as described above, a plurality of light emitter (L1-L8) is provided on the head part R1 of the robot R and is correlated with corresponding detectable region (Sa1-Sa8). That is, since directivity is established on the light emitter, the direction of the target object D with tag T can be measured accurately.

In this embodiment, additionally, each light emitter (L1-L8) is provided above the cameras C and C, the detection of the target object D can be achieved at almost the same height as the camera.

Thereby, an accurate detection of the target object D is enabled.

Figure 12:
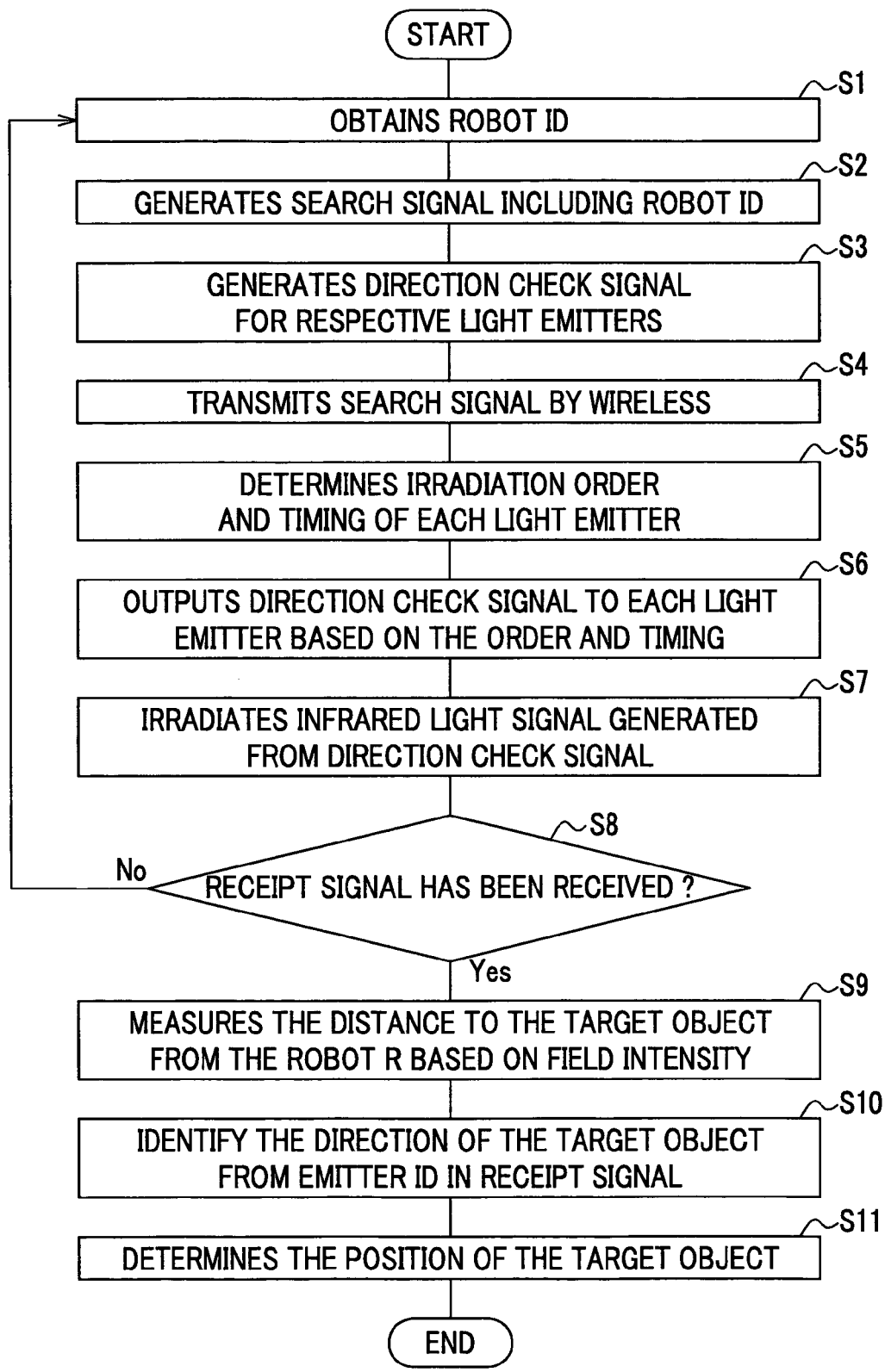
FIG. 12 is a flow chart for explaining the signal processing of the target detection unit of the robot.
Figure 13:
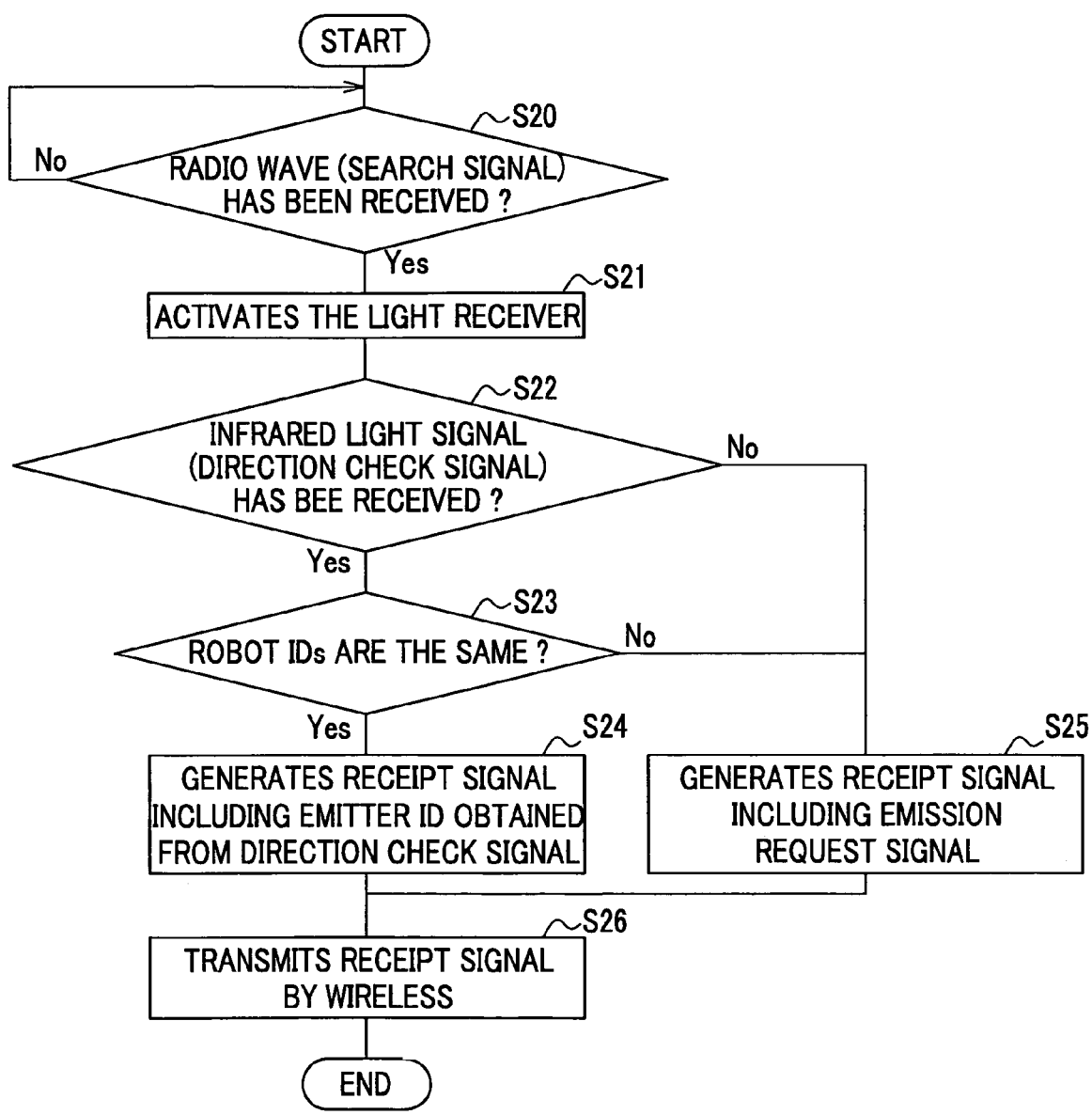
FIG. 13 is a flow chart for explaining the signal processing in the tag which serves as the target object.
Figure 14:
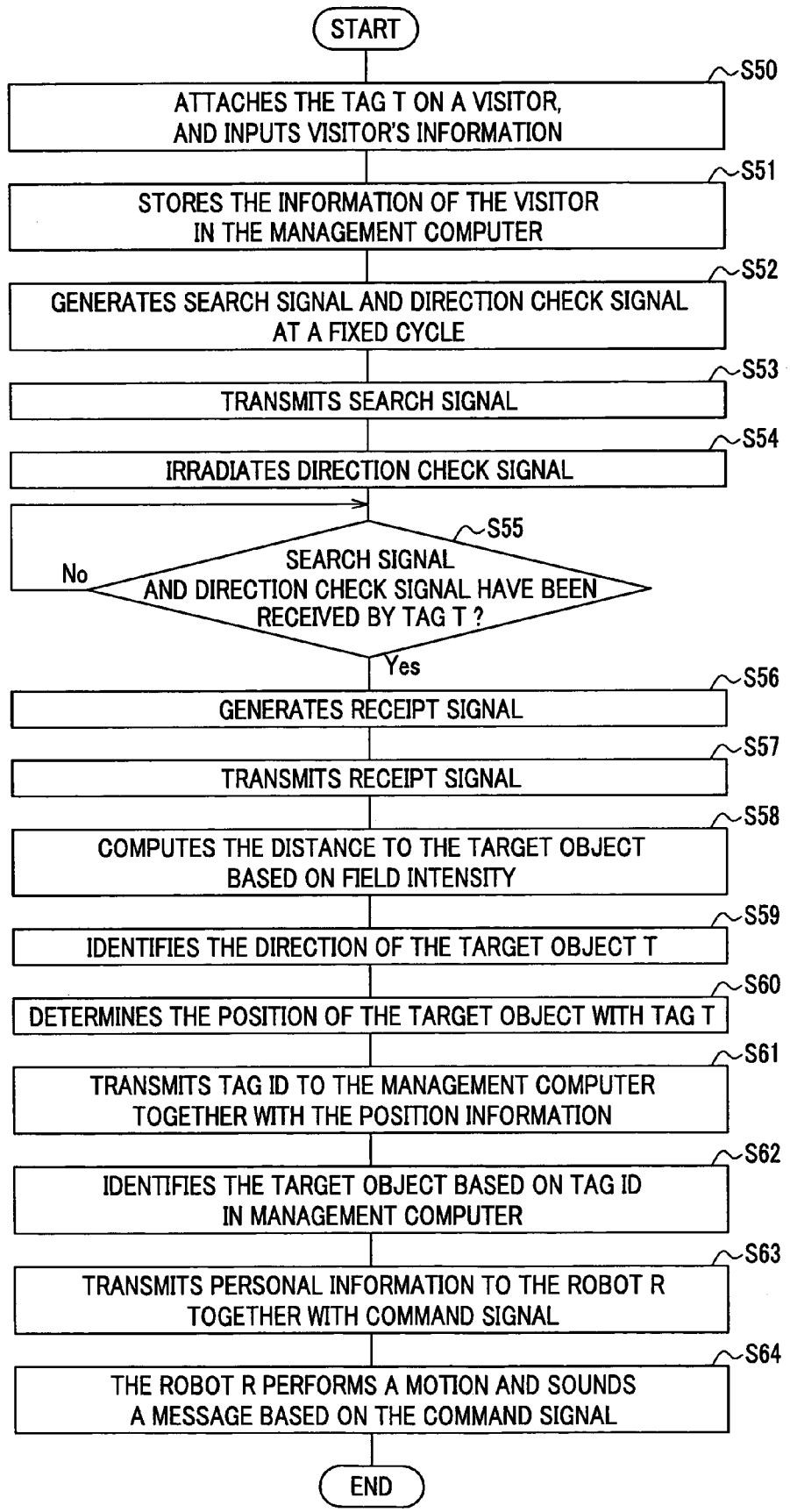
FIG. 14 is a flow chart for explaining the signal processing of the target object detection system.

Next, the data processing performed in the target object detection system A will be explained with reference to FIGS. 12 to 14.

The signal processing performed in the target detection unit 70 of the robot R will be explained with reference to FIG. 12.

The signal generator 81a of the unit controller 80 refers, at a predetermined cycle, to the recording unit 110, and obtains the unique identification number of the robot R, to which the unit controller 80 is being provided (Step S1). That is, the signal generator 81a obtains the robot ID from the recording unit 110.

Then, the signal generator 81a generates the search signal which includes the robot ID and receipt request signal (Step S2). Additionally, the signal generator 81a generates the direction check signal, which is irradiated as an infrared light signal from each light emitter of the light emission unit 100, for respective light emitters (Step S3).

Here, the direction check signal includes the robot ID obtained in step S1 and the emitter ID to be used for identifying the light emitter which emits the direction check signal.

The encryption unit 82 of the unit controller 80 encrypts the search signal to generate the encrypted search signal, and outputs the encrypted search signal to the radio transmitter-receiver 90. Thus, the encrypted search signal is modulated by a predetermined modulation scheme to generate the modulated signal. Then, the modulated signal is transferred through the transceiver antenna 93 (Step S4). That is, the search signal is transferred by wireless.

The encryption unit 82 of the unit controller 80 encrypts the direction check signal generated in the signal generator 81a to generate the encrypted direction check signal, and then outputs the encrypted direction check signal to the time division unit 83.

The time division unit 83 determines the irradiation order and timing of each light emitter (L1-L8) of the light emission unit 100, when the encrypted direction check signal is entered from the encryption unit 82 (Step S5). Then, the time division unit 83 outputs the encrypted direction check signal to the modulator of corresponding light emitter (L1-L8) based on the determined timing (Step S6).

The modulator of each light emitter (L1-L8) of the light emission unit 100 modulates the encrypted direction check signal by a predetermined modulation manner to obtain the infrared light signal of a predetermined wave length. Then, the infrared light signal is irradiated to the detectable region from the light emitter adjoining to the modulator (Step S7). Thereby, an infrared light is irradiated toward each detectable region established around the robot R by the determined order and timing.

The tag T generates the receipt signal (modulated signal) and transmits it by wireless, when the tag T receives the search signal (modulated signal) transmitted from the transceiver antenna.

The demodulator 92 obtains the encrypted receipt signal by demodulating the modulated signal, when the demodulator 92 receives the modulated signal (receipt signal) transferred from the tag T.

The demodulator 92 outputs the encrypted receipt signal to the decoder 84 and field intensity measuring unit 85 of the unit controller 80.

The decoder 84 of the unit controller 80 decodes the encrypted receipt signal to obtain the receipt signal, and outputs the receipt signal to the data processor 81.

The field intensity measuring unit 85 of the unit controller 80 detects a power of the encrypted receipt signal, which is entered from the demodulator 92 of the radio transmitter-receiver 90, and computes an average of the detected power. Then, the field intensity measuring unit 85 outputs the computed average value as the data of the field intensity to the data processor 81.

The position computing part 81b refers to the distance table based on the field intensity entered from the field intensity measuring unit 85, and obtains information (area information) which indicates which area among areas (from area I to area IV) the tag T that has transmitted the receipt signal exists in (Step S9). That is, the position computing part 81b measures the distance from the robot R to the tag T based on the intensity of the field intensity.

The position computing part 81b refers to the direction table stored in the recording unit 110 based on the emitter ID, which is obtained in the receipt signal entered form the decoder 84. Then, the position computing part 81b obtains the information (direction information) which identifies the light emitter which has irradiated an infrared light received by the tag T.

Then, the position computing part 81b generates the position information which indicates the position of the target object D from area information and direction information (Step S11). Thus, the position of the target object D is determined.

If the receipt signal (modulated signal) transferred from the tag T has not been received by the demodulator 92 of the radio transmitter-receiver 90 (Step S8, No), the demodulator 92 keeps the standby condition till the receipt signal (modulated signal) is received.

Next, the signal processing to be performed in tag T which serves as the target object D will be made with reference to the block diagram of FIG. 11 and the flow chart of FIG. 13.

When radio wave (modulated signal) transferred from the robot R has been received through the antenna 141 (Step S20, Yes), the demodulator 142 of the radio transceiver 140 demodulates the modulated signal to obtain the encrypted search signal. Then, the demodulator 142 outputs the encrypted search signal to the receipt signal generator 160.

The decoder unit 161 of the receipt signal generator 160 decodes the encrypted search signal entered from the radio transceiver 140 to obtain the search signal. Then, the decoder unit 161 outputs the search signal to the processor unit 162.

The processor unit 162 of the receipt signal generator 160 changes the condition of the light receiver 150 from a standby condition to an activated condition in response to the receipt signal included in the search signal (Step S21).

When the optical receiver 151 of the light receiver 150 receives the infrared light signal irradiated from the robot R within a predetermined time after activating the light receiver 150 (Step S22, Yes), the light demodulator 152 of the light receiver 150 demodulates the infrared light signal to obtain the encrypted direction check signal. Then, the light demodulator 152 outputs the encrypted direction check signal to the receipt signal generator 160.

Thus, the decoder unit 161 of the receipt signal generator 160, to obtain the direction check signal, decodes the encrypted direction check signal and outputs the direction check signal to the processor unit 162.

The processor unit 162 of the receipt signal generator 160 compares the robot ID included in the direction check signal with the robot ID included in the search signal.

If both robot IDs agree each other (Step S23), the processor unit 162 generates the receipt signal. Prior to the generation of the receipt signal, the processor unit 162 refers to the storage 170 and obtains a unique identification number (tag ID) assigned to the tag T.

Then, the processor unit 162 generates the receipt signal which includes the tag ID, the robot ID included in the search signal, and the emitter ID included in the direction check signal, and the processor unit 162 outputs the generated receipt signal to the encryption unit 163 (Step S24).

Here, the processor unit 162 generates the receipt signal which further includes the emission request signal therein, if the direction check signal is not entered within a predetermined time after activating the light receiver 150 (Step S22, No) or if the robot ID of the direction check signal disagrees with the robot ID of the search signal (Step S23, No) Then, the processor unit 162 outputs the generated receipt signal to the encryption unit 163.

The modulator 143 of the radio transceiver 140, to obtain the modulated signal, modulates the encrypted receipt signal entered from the encryption unit 163, and then transmits the modulated signal by wireless through the antenna 141 (Step S26).

Finally, the processing in the target object detection system A, which is adapted to the detection of the visitor of the office, will be explained with reference to the block diagrams of FIGS. 4, 5, and 11, the flow chart of FIG. 14.

A visitor of the office, for example, receives the tag T at the reception desk, and information, e.g. a name of the visitor and visiting section, is inputted through the terminal 5 disposed on the reception desk (Step S50).

Thus, information entered from the terminal 5 is stored in the recording unit (not shown) of the management computer 3 which connects with the terminal 5 through the network 4 (Step S51).

Then, the visitor attached the tag at the reception desk and begins to travel to the visiting section.

The controller 40 of the target detection unit 70 generates the search signal and direction check signal at a fixed cycle (Step S52), and the generated search signal is transferred by wireless from the radio transmitter-receiver 90 (Step S53).

The direction check signal is modulated in the light emission unit 100, and then the modulated signal is irradiated, as an infrared light signal, to the predetermined search area (Step S54).

When the tag T receives the direction check signal in addition to the search signal (Step S5, Yes), the receipt signal is generated (Step S56), and then the receipt signal is transferred by wireless (Step S57).

When the unit controller 80 receives the receipt signal transferred by wireless from the tag T, the unit controller 80 computes the distance from the robot R to the target object D based on the field intensity of the receipt signal (Step S58). The unit controller 80 identifies the light emitter which has irradiated the light signal received by the tag T. Then, the unit controller 80 regards the irradiation direction of the identified light emitter, as the direction of the target object D (Step S59). Thereby, the position of the target object D is determined (Step S60).

The unit controller 80 of the target detection unit 70 outputs the position information and tag ID, which is obtained from the receipt signal, to the controller 40 of the robot R.

The controller 40 of the robot R transmits the tag ID to the management computer together with the position information (Step S61) In the management computer 3, the identification (reorganization) of the target object D (person) equipped with the tag T, to which tag ID is assigned, is performed, by searching the recording unit (not shown) based on the tag ID (Step S62).

Then, the information (personal information) with regard to the identified target object D (person) is transferred to the robot R together with the command signal to be required for actuating the robot R (Step S63).

Then, the robot R performs the motion (travel) and sounds the voice message, based on the command signal entered from the management computer 3. In the present invention, for example, the robot R performs the following motions etc.

1) the robot R moves to the from position of the target object D (person) with the tag T, and performs the image pickup of the face image of the target object D, 2) the robot R sounds the voice message such as "GOOD MORNING Mr.", and 3) the robot R sends the predetermined message to the target object D (person).

Second Embodiment

Next, the second embodiment of the outside monitoring device of the present invention will be explained.

Figure 15:
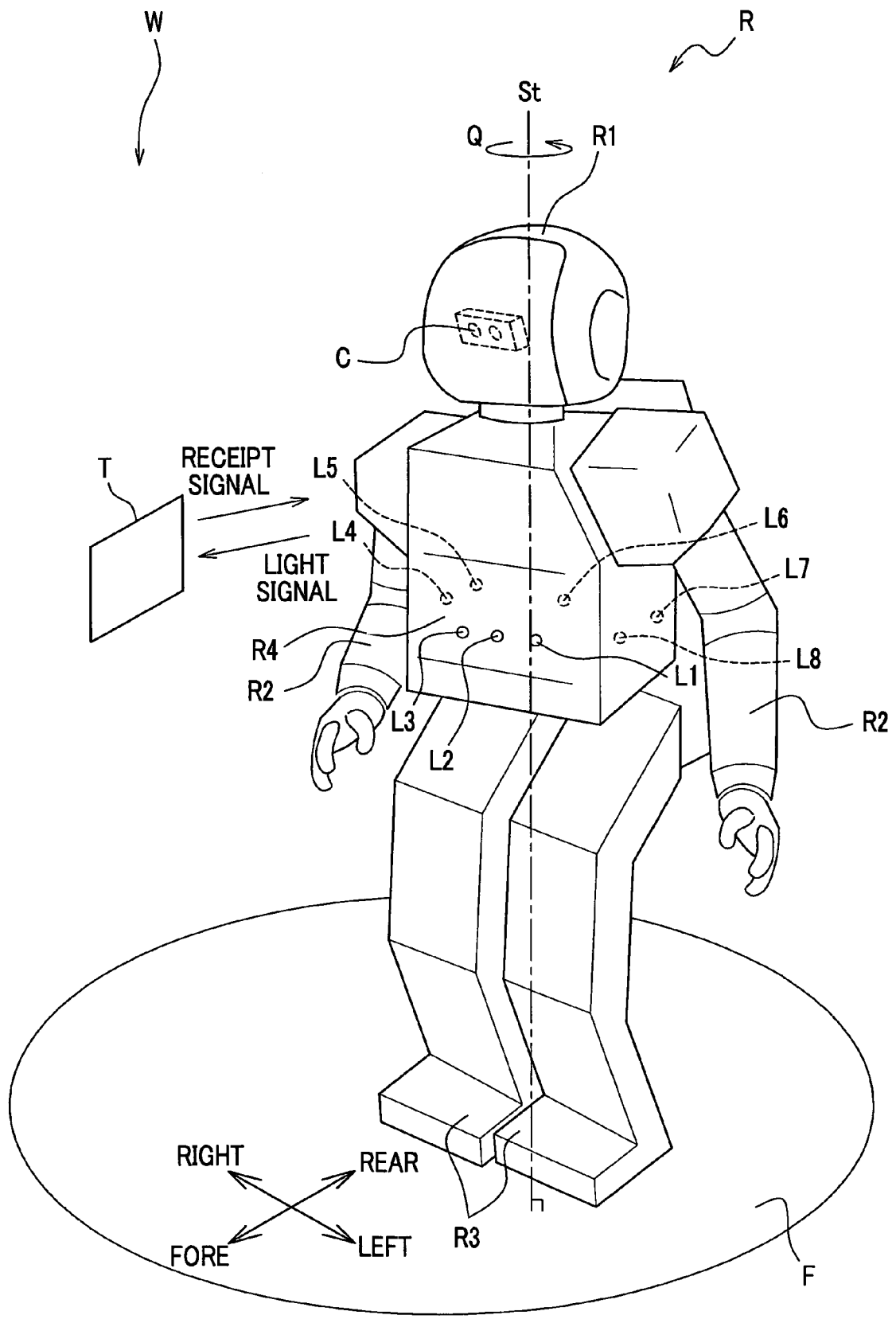
FIG. 15 is a perspective view of an exterior appearance of the robot equipped with the outside monitoring device of second embodiment.
Figure 16:
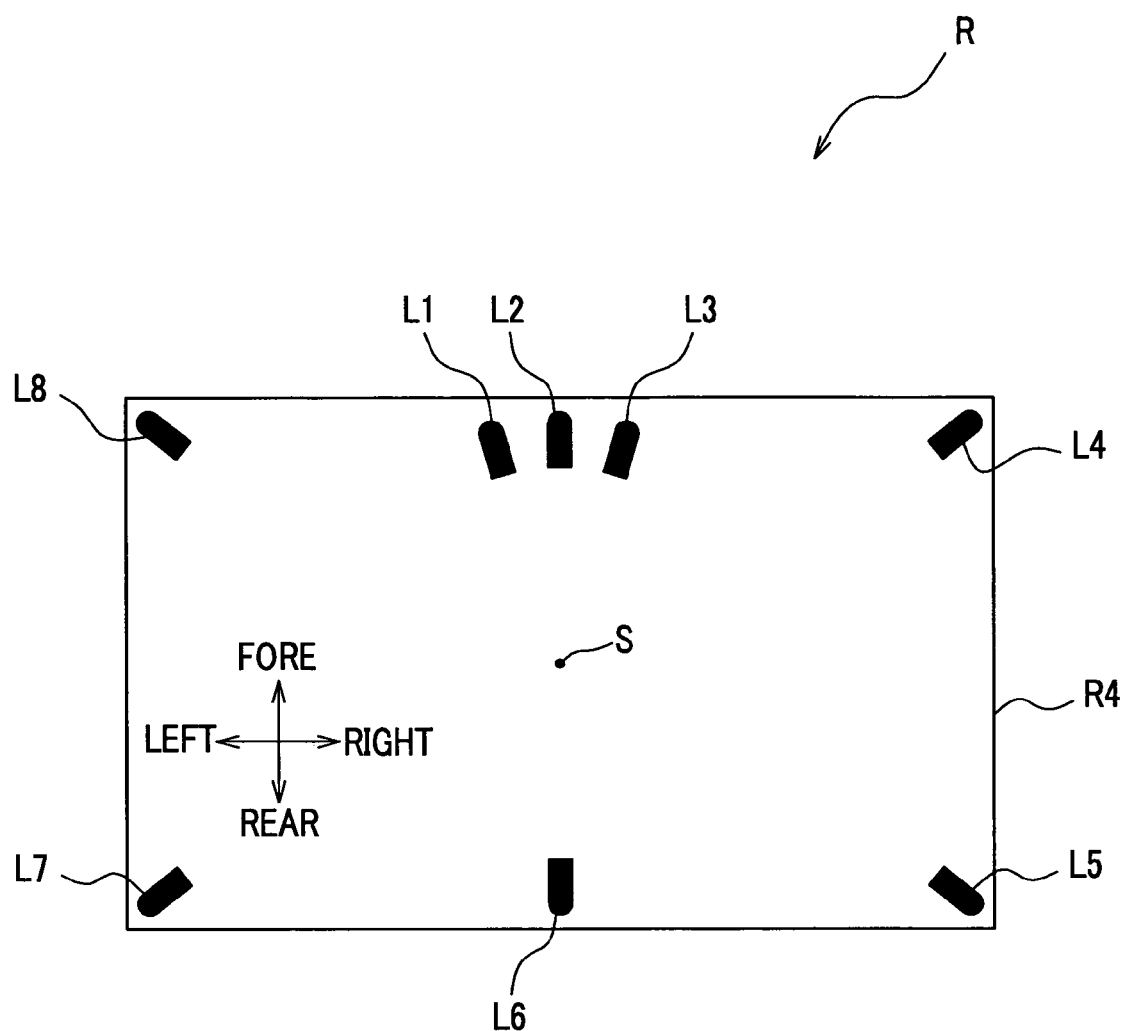
FIG. 16 is a plane view showing the installation manner to the body part of the light emitter of the outside monitoring device of second embodiment.

As shown in FIG. 15 and FIG. 16, light emitters (L1-L8) of the monitoring device W1 are disposed around the body part R4 of the robot R, and are arranged around the reference axis St, which is established so as to pass the center of the robot R.

Similar to first embodiment, respective light emitters of second embodiment are arranged around the reference axis St. That is, light emitters L1-L3, the light emitter L6, light emitters L4 and L5, and light emitters L7 and L8 are disposed in a front side, a rear side, a right side, and left side, respectively.

Here, the construction of the light emitter of second embodiment is the same as that of first embodiment except that the light emitters are provided on the body part R4 of the robot R. Therefore, the detailed explanation of the light emitters of second embodiment will be omitted here.

In this embodiment, since light emitters (L1-L8) are arranged around the body part R4 of the robot R, the detection of the tag T (target object D) within the surrounding area of the robot R is enabled.

Additionally, since each light emitter L1-L8 is correlated with corresponding detectable region (Sa1-Sa8), which are established around the robot R, and directivity is established on the light emitter, the direction of the target object D with tag T can be measured accurately.

In this case, the detection of the tag T' can be achieved accurately, even if the tag T' is located in the vicinity of the robot R but is located at a lower position in height. This is because tag T' is within the detectable region Sa2' of infrared light from the robot R.

Figure 17:
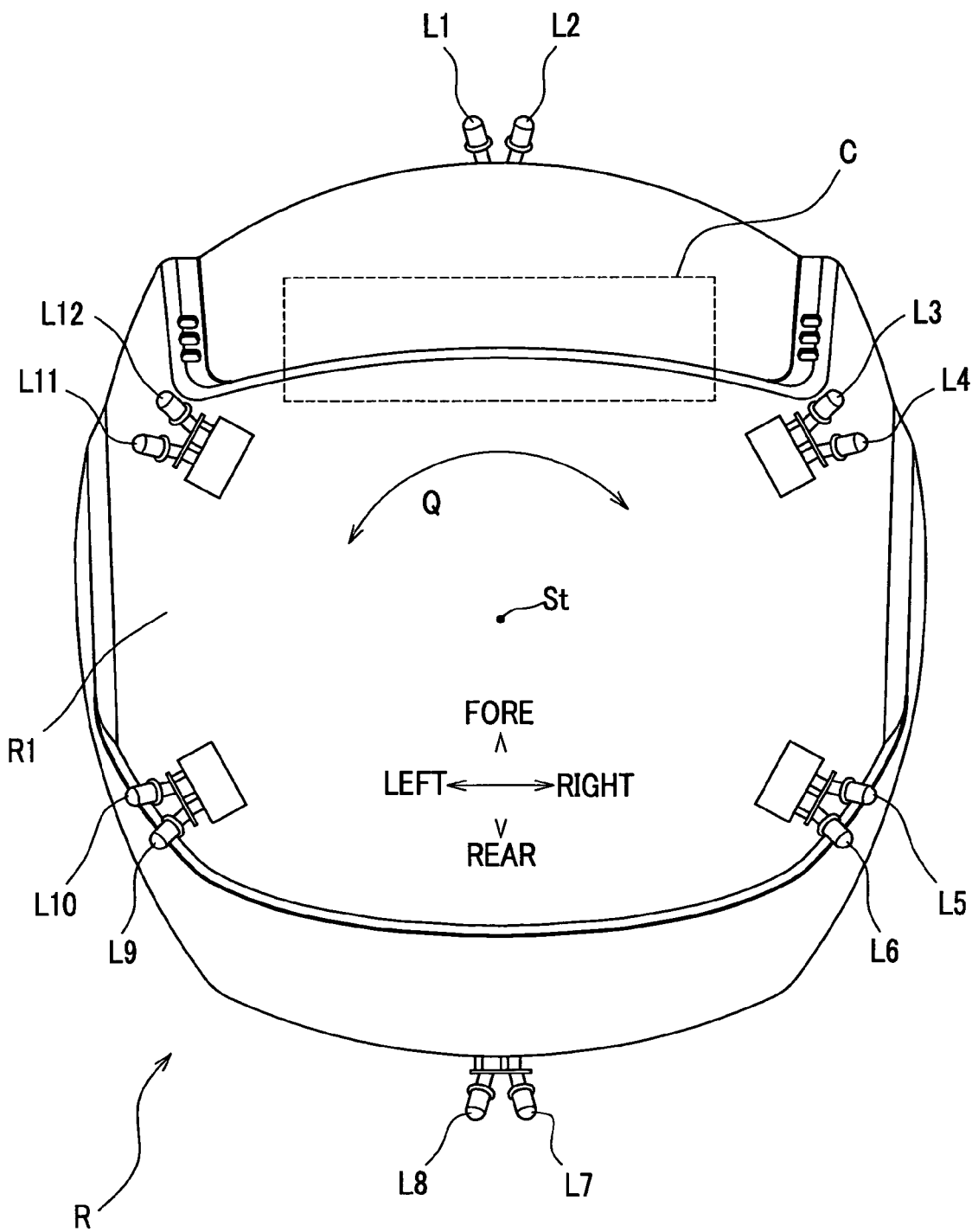
FIG. 17 is a modification example of the outside monitoring device of second embodiment.

FIG. 17 is a plane view of a modification example of the monitoring device.

In this example, a total of twelve light emitters (L1-L12) are disposed at six places on the head part R1 of the robot R. That is, two light emitters are disposed at each installation place. Here, the number of light emitters disposed at each installation place is not limited to two, for example, light emitter may be disposed per three, four, or more.

In this embodiment, a pair of light emitters L1 and L2, a pair of light emitters L7 and L8, a pair of light emitters L3 and L4, a pair of light emitters L5 and L6, a pair of light emitters L9 and L10, and a pair of light emitters L11 and L12 are disposed, as a single component, at a predetermined place of the head part R1.

That is, respective light emitters are disposed around the reference axis St, and a pair of light emitters L1 and L2, light emitters L7 and L8, light emitters L3 and L4, light emitters L5 and L6, light emitter L9 and L10, and emitters L11 and L12 are disposed in a front side, a rear side, a right side, and left side with respect to the reference axis St, respectively.

In FIG. 17, each light emitter (L1-L12) protrudes from the surface of the head part R1 of L12*he* robot R. But, actually, tip of each light emitter (L1-L12) is flush with the surface of the head part R1 of the robot R. That is, tip of each light emitter does not protrude from the surface of the head R1.

Additionally, the direction of each light emitter (L1-L12) may be adjusted so that the interference of an infrared light is not caused at the overlapping edge between adjoining detectable regions.

In common with the case of FIG. 6A, it is preferable that the irradiation timing and order of each light emitter is controlled so that the interference of an infrared light can be prevented, if adjoining detectable regions overlap each other at edge.

In this embodiment, since each installation place is provided with a pair of light emitters, the installation of the light emitters can be achieved using a small number of parts and the installation process can be simplified.

Here, a height from the ground plane F of respective light emitters (L1-L12) may not exactly the same one another. The height from the ground plane F of respective light emitters (L1-L12) may be sifted in a height direction. For example, each light emitter may be disposed so that light emitters (L3-L6 and L9-L1) are placed each other on the same level and are placed higher than light emitters (L1, L2, L7, and L7)

In the present embodiment, a light signal is used for detecting the direction of the target object, but a radio wave which has a bandwidth having directivity, such as an ultrasonic wave and a micro wave, can be adoptable instead of a light signal. For example, an ultrasonic sensor and a microwave sensor of 2.4 GHz, 10 GHz, and 24 GHz may be adoptable to formulate the system having the same construction of the above described embodiment.

Third Embodiment

Figure 18:
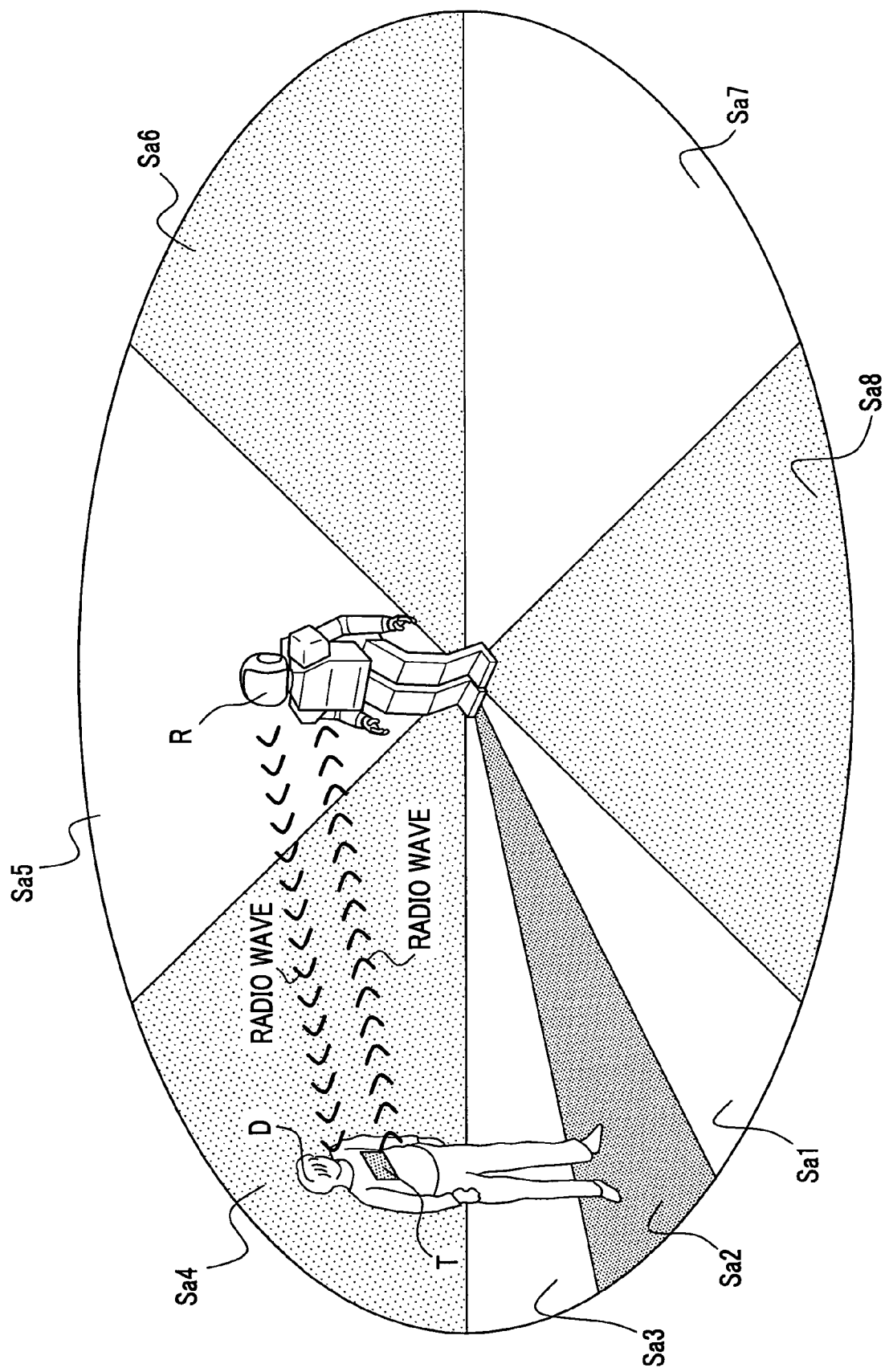
FIG. 18 is an explanatory view of the detection of the direction of the target object by transmitting radio wave from the robot equipped with the outside monitoring device of the third embodiment.

Next third embodiment of the present invention will be explained with reference to FIG. 18.

The system of the third embodiment has the same construction as the system of first embodiment except that a radio transceiver which transmits a radio wave is used instead of a light emitter of the robot R.

In this case, since directivity is realized by increasing the frequency of radio wave even if the radio transceiver is used instead of the light emitter. The detection of the direction of the target object D with tag T can be achieved in a similar way as first embodiment.

Although there have been disclosed what are the patent embodiments of the invention, it will be understood by person skilled in the art that variations and modifications may be made thereto without departing from the scope of the invention, which is indicated by the appended claims.

Especially, the number and instillation place of the light emitter and a range of the detectable range of each light emitter may be modified as appropriate.

The installation place of the light emitters (L1-L8) is not limited only to the head part R1 or the body part R4. The light emitters (L1-L8) may be disposed both of the head part R1 and the body part R4.

As shown in FIG. 6B, detectable regions may be established so that detectable areas are adjoining in a height direction (see Sa2 and Sa2' of FIG. 6B). In this case, the height of the target object D can be measured in addition to the direction of the target object D. Thereby, since the distinction between an adult and a child can be achieved, the sound of the voice can be controlled based on the result of the distinction.

What is claimed is:

1. An outside monitoring device disposed on an autonomous legged mobile robot to detect a tag carried therearound, comprising:
    a plurality of light transmitters on the mobile robot configured to transmit light signals toward predetermined emission regions around the mobile robot of which directions are different therefrom one another,
    wherein the light transmitters are arranged around a vertical axis of the mobile robot on a ground plane,
    wherein the mobile robot comprises a head part and a body part supporting the head part, and the light emitters are disposed on the head part or the body part, and
    wherein the light emitters disposed on a front portion of the head part or the body part are arranged closer together and comprise a narrower light emitting range around the vertical axis of the mobile robot than the light emitters disposed on other portions of the head part or the body part.

2. The outside monitoring device as claimed in claim 1, wherein a light transmitter on a front part of the mobile robot has an emission region with a smaller horizontal angle than a transmitter on a part of the mobile robot other than the front part.

3. An outside monitoring device disposed on an autonomous legged mobile robot to detect a tag positioned thereon, the device comprising:
    a plurality of light transmitters on the mobile robot configured to transmit light signals toward predetermined emission regions around the mobile robot of which directions are different therefrom one to another, wherein the plurality of light transmitters are arranged around a vertical axis of the mobile robot on a ground plane, wherein the mobile robot comprises a head part and a body part supporting the head part, and wherein the light emitters are disposed on the head part or the body part;

a signal generator configured to generate search signals including different transmitter identifiers (IDs) of the light transmitters to cause the light signals to include different respective transmitter IDs, respectively;

a receiver configured to receive a reception signal corresponding to the transmitter ID; and a determining unit configured to determine, based on the reception signal, which one of the transmitter IDs corresponds to the reception signal, determine from which one of the predetermined emission regions the reception signal is transmitted, and determine a direction of the tag from the mobile robot based on the determined one of the predetermined emission regions.

4. The outside monitoring device as claimed in claim 3, further comprising:
a field intensity measuring unit configured to measure a field intensity of the reception signal to determine a distance between the tag and the mobile robot.

5. An outside monitoring device for a mobile robot to detect a tag positioned therearound, comprising:
a plurality of light transmitters located on the mobile robot configured to transmit light signals to predetermined emission regions around the mobile robot that are in different directions with respect to one another, the light signals including different respective transmitter identifiers (IDs), wherein the ID tag includes a receiver configured to receive the light signal and a radio wave transmitter configured to transmit a radio wave reception signal including data corresponding to a transmitter ID received by the receiver;
a radio wave receiver configured to receive the radio wave reception signal from the radio wave transmitter; and
a determining unit configured to determine which one of the transmitter IDs corresponds to the reception signal, determine from which one of the predetermined emission regions the reception signal is transmitted based on the data corresponding to the transmitter ID received by the radio wave receiver, and determine a direction of the ID tag therefrom based on the determined one of the predetermined emission regions.

6. The outside monitoring device as claimed in claim 5, wherein a light transmitter on a front part of the mobile robot has a smaller horizontal angle of an emission region than a transmitter on a part other than the front part.

7. The outside monitoring device as claimed in claim 6, wherein the determining unit is configured to determine which one of the light transmitters is directed to the ID tag to determine the direction of the ID tag therefrom on the basis of the data corresponding to the transmitter ID received by the radio wave receiver.

8. The outside monitoring device as claimed in claim 1, further comprising:
a receiver configured to receive a reception signal from the tag;
a direction measuring unit configured to measure a direction of the tag on the basis of the reception signal;
an image pickup device, disposed on the head part, configured to pick up an image; and
a controller configured to control the mobile robot to turn the image pickup device on the basis of the measured direction.

9. The outside monitoring device as claimed in claim 8, further comprising a voice message generator configured to send a message to a target carrying the tag after the controller turns the image pickup device.

10. The outside monitoring device as claimed in claim 9, further comprising a face recognition unit configured to recognize a face image of the target on the picked up image, wherein the voice message generator sends the message to the target.

11. The outside monitoring device as claimed in claim 8, further comprising a recognition unit configured to recognize an image of the target on the picked up image, wherein the direction of the tag is detected, then the image of the target is recognized on the basis of the measured direction, and then the mobile robot performs a predetermined motion on the basis of the result of the recognition.

12. An outside monitoring device disposed on an autonomous legged mobile robot to detect a tag carried therearound, comprising:
a plurality of light transmitters on the mobile robot configured to transmit light signals toward predetermined emission regions around the mobile robot of which directions are different therefrom one another,
wherein the light transmitters are arranged around a vertical axis of the mobile robot on a ground plane, and
wherein the mobile robot comprises a head part and a body part supporting the head part, and the light emitters are disposed on the body part, and
wherein the light emitters disposed on a front portion of the body part are arranged closer together and comprise a narrower light emitting range around the vertical axis of the mobile robot than the light emitters disposed on other portions of the body part.

13. The outside monitoring device of claim 3, wherein the reception signal is generated and modulated by the tag in response to a search signal.

14. The outside monitoring device of claim 5, wherein the plurality of light emitters are disposed on a front portion of a head part or a body part of the mobile robot are arranged closer together and comprise a narrower light emitting range around the vertical axis of the mobile robot than the light emitters disposed on other portions of the head part or the body part.

* * * * *